(12) United States Patent
Ueyama

(10) Patent No.: US 10,983,030 B2
(45) Date of Patent: Apr. 20, 2021

(54) SAMPLE STORAGE TUBE

(71) Applicant: KOBE BIO ROBOTIX CO, LTD., Kato (JP)

(72) Inventor: Yukio Ueyama, Kobe (JP)

(73) Assignee: KOBE BIO ROBOTIX CO., LTD., Hyogo (JP)

(*) Notice: Subject to any disclaimer, the term of this patent is extended or adjusted under 35 U.S.C. 154(b) by 225 days.

(21) Appl. No.: 15/580,604

(22) PCT Filed: Dec. 19, 2016

(86) PCT No.: PCT/JP2016/087791
§ 371 (c)(1),
(2) Date: Dec. 7, 2017

(87) PCT Pub. No.: WO2018/116351
PCT Pub. Date: Jun. 28, 2018

(65) Prior Publication Data
US 2019/0247849 A1 Aug. 15, 2019

(51) Int. Cl.
*B01L 3/00* (2006.01)
*G01N 1/00* (2006.01)
(Continued)

(52) U.S. Cl.
CPC ............. *G01N 1/00* (2013.01); *B01L 3/5082* (2013.01); *G01N 1/10* (2013.01); *G01N 35/02* (2013.01);
(Continued)

(58) Field of Classification Search
CPC ...... B01L 3/50825; B01L 3/14; B01L 3/5082; B01L 2300/042; B01L 2200/14;
(Continued)

(56) References Cited

U.S. PATENT DOCUMENTS 4,674,640 A 6/1987 Asa et al.
5,753,186 A 5/1998 Hanley et al.
(Continued)

FOREIGN PATENT DOCUMENTS

CN 1974015 A 6/2007
CN 102271813 A 12/2011
(Continued)

OTHER PUBLICATIONS

International Search Report and Written Opinion, International Patent Application No. PCT/JP2016/087791, dated Mar. 14, 2017 (10 pages).
(Continued)

*Primary Examiner* — Matthew D Krcha
*Assistant Examiner* — Jacqueline Brazin
(74) *Attorney, Agent, or Firm* — Hamre, Schumann, Mueller & Larson, P.C.

(57) ABSTRACT

[Problem to be solved] To provide a sample storage tube wherein a lid is a push stopper lid type securing the area for writing two-dimensional code.
[Solution] A sample storage tube 100 comprise a tube body 120 for storing a sample; a push stopper lid body 110 for capping the upper opening 121 of the tube body 120; and a hinge body 130 for connecting the tube body 120 and the push stopper lid body 110. The push stopper lid body 110 and the tube body 120 and the hinge body 130 are molded in one piece, wherein a part of them is formed by the light transmissive material and the other part of them is formed by the opaque material in which the information code can be written. The information writable areas are installed at least on the upper surface of the push stopper lid body 110 and the bottom surface 123 of the tube body 120. The information code can be written on both the upper surface of the push stopper lid body 110 and the bottom surface 123 of the tube (Continued)

body 120. The opaque material extends continuously from the upper surface of the push stopper lid body 110 to hinge body 130 and the side surface of the tube body 120 up to the bottom surface 123 of the tube body 120 as one piece.

9 Claims, 17 Drawing Sheets

(51) Int. Cl.
*G01N 1/10* (2006.01)
*G01N 35/02* (2006.01)

(52) U.S. Cl.
CPC ....... *B01L 3/50825* (2013.01); *B01L 2200/14* (2013.01); *B01L 2300/021* (2013.01); *B01L 2300/042* (2013.01); *B01L 2300/043* (2013.01); *B01L 2300/044* (2013.01); *B01L 2300/0858* (2013.01); *B01L 2300/12* (2013.01)

(58) Field of Classification Search
CPC ....... B01L 2300/0858; B01L 2300/043; B01L 2300/044; B01L 2300/021; B01L 2300/12; B01L 2300/168; G01N 1/00; G01N 1/10; G01N 35/02
USPC ......................................... 422/550
See application file for complete search history.

(56) References Cited

U.S. PATENT DOCUMENTS

| | | | |
|---|---|---|---|
| 5,863,791 A | | 1/1999 | Baldzun et al. |
| 2006/0025718 A1 | | 2/2006 | Ostrowski |
| 2007/0017927 A1 | | 1/2007 | D'Amore et al. |
| 2008/0139707 A1* | | 6/2008 | Kawakami ........... C08K 5/0041 524/88 |
| 2008/0257882 A1* | | 10/2008 | Turner ................ B01L 3/50853 220/23.2 |
| 2011/0085951 A1* | | 4/2011 | Nakahana ............. B01L 3/5082 422/549 |
| 2012/0087848 A1 | | 4/2012 | Nakahana et al. |
| 2015/0371564 A1* | | 12/2015 | Kakuda .................... B41M 5/28 422/547 |
| 2016/0038943 A1 | | 2/2016 | Hagiwara et al. |
| 2016/0251708 A1* | | 9/2016 | Adey ..................... C12Q 1/686 435/6.12 |

FOREIGN PATENT DOCUMENTS

| | | |
|---|---|---|
| CN | 102481570 A | 5/2012 |
| CN | 103240135 | 8/2013 |
| CN | 105074473 A | 11/2015 |
| EP | 1741488 A1 | 1/2007 |
| EP | 2253959 A1 | 11/2010 |
| EP | 2446966 A1 | 5/2012 |
| EP | 2982989 A1 | 2/2016 |
| JP | 2001-246267 A | 9/2001 |
| JP | 2003-083984 A | 3/2003 |
| JP | 2007-017441 A | 1/2007 |
| JP | 2007-153446 A | 6/2007 |
| KR | 20150139845 A | 12/2015 |
| WO | 2007/018526 A2 | 2/2007 |
| WO | 2009/150881 A1 | 12/2009 |
| WO | 2010/150415 | 12/2010 |
| WO | 2014/136676 A1 | 9/2014 |
| WO | 2014/163190 A1 | 10/2014 |
| WO | 2016/132018 | 8/2016 |

OTHER PUBLICATIONS

The extended European Search Report issued for European Patent Application No. 16903369.3, dated Oct. 2, 2019, 8 pages.
Communication including Intention to grant issued for European Patent Application No. 16903369.3, dated Jun. 15, 2020, 6 pages.

* cited by examiner

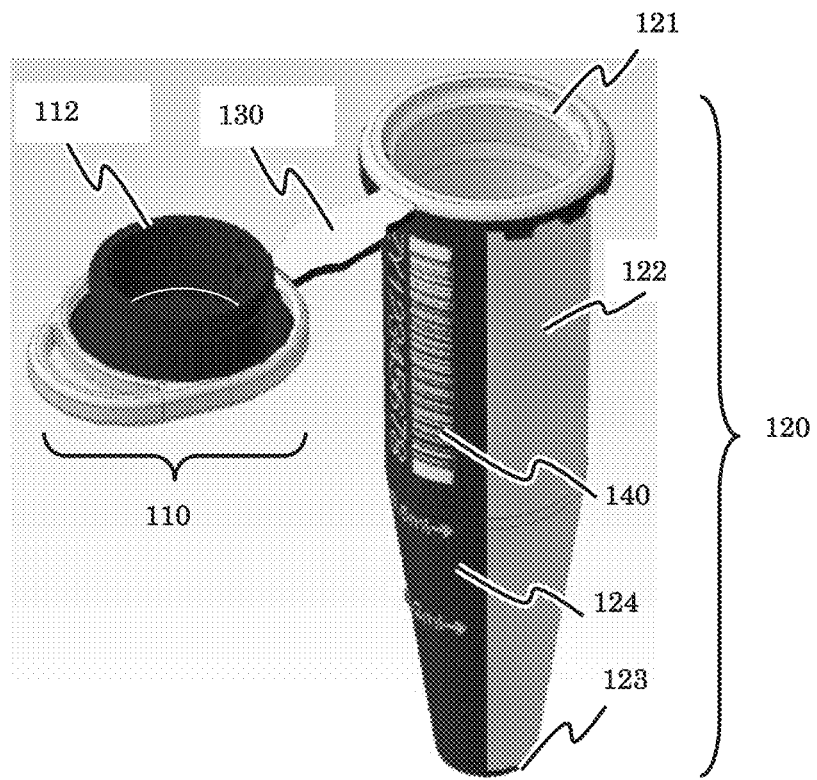
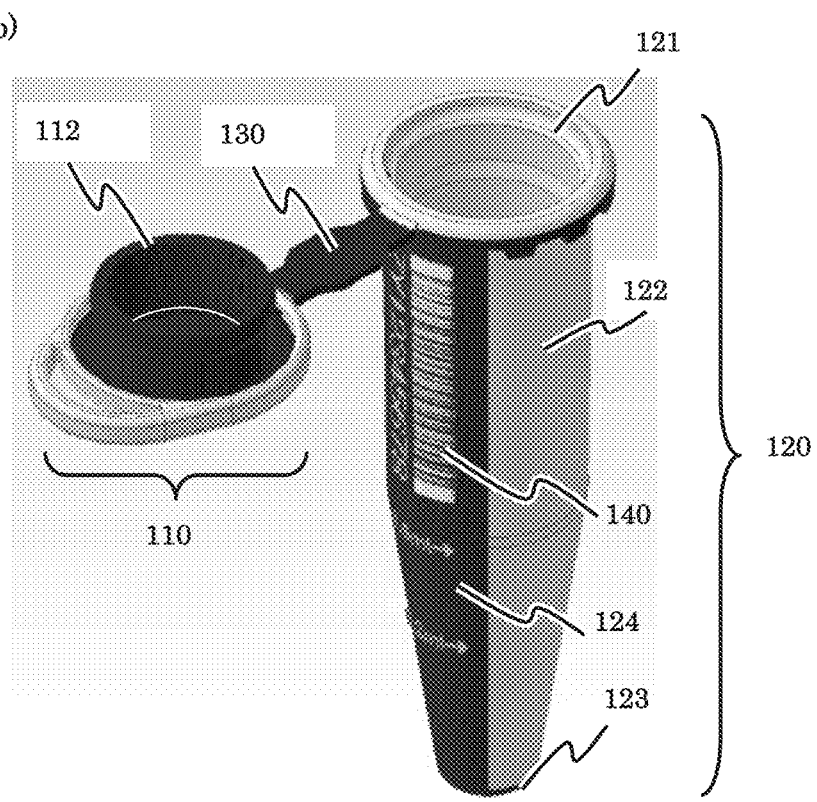
Fig.3

(a)

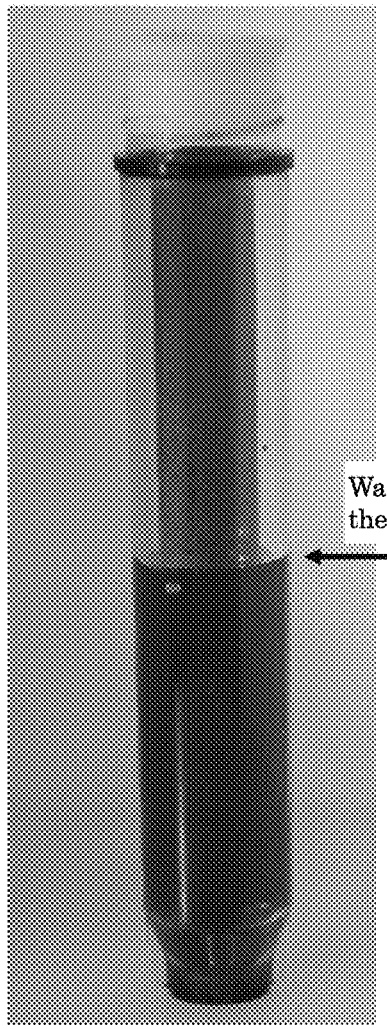

Waterline of the sample (b)

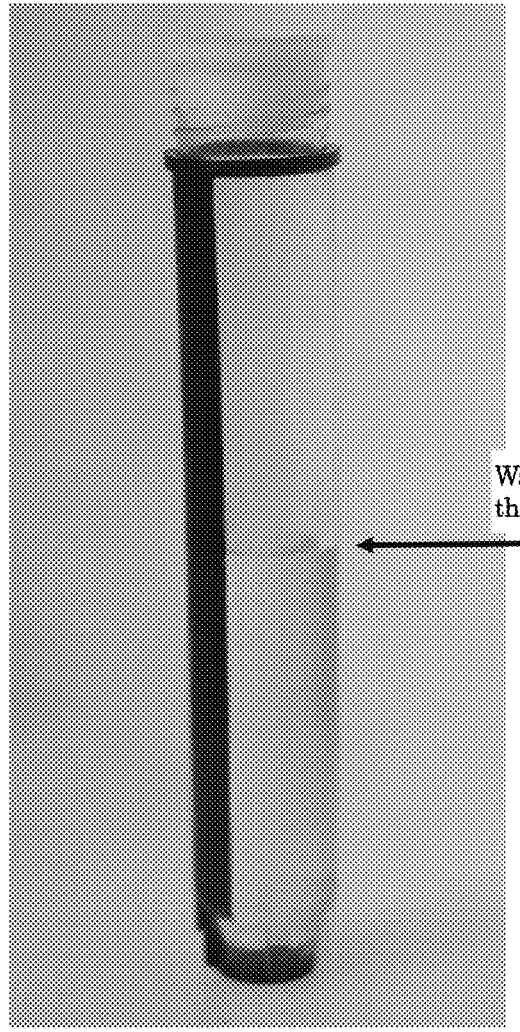

Waterline of the sample

When observing the sample from the front direction of the tube body 120, the sample lower than the waterline is looked as black by overlapping opaque band as the background and the inner air higher than the waterline is looked as transparent. There is visual effect for clear contrast When observing the sample from the side direction of the tube body 120 to prevent from overlapping the opaque band as the background, there is no visual effect for clear contrast

Fig.13

[Prior art : A sample storage tube shown in JP 2007-153446]

SAMPLE STORAGE TUBE

TECHNICAL FIELD

This invention relates to a sample storage tube for storing and holding samples. For example, the sample storage tube is used in holding and storing medicine samples being developed. Also, it is used for storing, refrigerating, freezing and preserving samples that hold gene information of DNA in the medical field. As such a sample storage tube becomes small, it is called a micro tube.

BACKGROUND ART

In the research and development of medicine and chemicals, sample storage tubes are used extensively in storing a large number of samples. For example, scientists prepare a large number of samples for a comparative experiment with slightly changing conditions such as blending amount, and they use storage tubes for storing the samples for a required period of time while evaluating them.

In order to control and store a large number of storage tubes at one time as described above, there are two types of the sample storage systems known in the prior art. The first type is a well-plate block type of the sample storage container. The second type is a micro tube array type arraying a lot of sample storage containers of the micro tube type in the storage rack.

The micro tube array stores and contains each test sample in each small sample container called the micro tube piece by piece independently and arrayed in the storage rack. The micro tube is a container about several centimeters in height and made of plastic material. Each micro tube is an independent piece, and it is possible to use them as sample storage containers one by one. It is also possible to use the micro tube array storing a lot of test samples at the same time by arraying a lot of micro tubes in the storage rack.

If a micro tube becomes small, more micro tubes can be stored in the rack and the space of the high price refrigerator or the high price freezer can be utilized effectively. Analysis technology for the sample storage is improved recently, and the required quantity for the analysis becomes small. Therefore, the size of a micro tube can be downsized.

The micro tube comprises a tube body, which has an opening at the top, for storing the sample; a lid for enclosing the opening of the tube body.

As a screw type lid of the micro tube, all micro tubes employ a separate type lid which is separated from the tube body. There are no combine type lid which has connection portion connecting the lid and the tube body.

There are two types of lids. The one is a screw lid type, the other is a push stopper lid type.

FIG. 16 is a schematic view showing the conventional micro tube 1 that employs a push stopper lid with hinge.

As shown in FIG. 16, the conventional micro tube 1 employs a push stopper lid with hinge, and the push stopper lid 14 with hinge is pushed into the opening 5 of the tube body 4 for capping and decapping the opening 5. The push stopper lid 14 is connected to the tube body 4 via the hinge 17. The push stopper lid 14 is connected to the tube body 4 by the hinge when the push stopper lid 14 is decapped from the tube body 4.

The upper shape of the lid shown in FIG. 16 is flat, but the lower portion of the lid has a protrusion fitting to the upper opening 5 of the tube body 4.

The conventional micro tube 1 employing a push stopper lid with hinge de-caps the push stopper lid 14 from the upper opening 5 of the tube body 4 by flipping up the flange 15 of the push stopper lid 14 with a thumb, and caps the push stopper lid 14 to the upper opening 5 of the tube body 4 by pushing down the flange 15 of the push stopper lid 14 by thumb. The conventional micro tube 1 employing a push stopper lid with hinge can include the locking mechanism working between the push stopper lid 14 and the upper opening 5 of the tube body 4 for avoiding unexpected separation of the push stopper lid 14 from the upper opening 5 of the tube body 4.

The basic design for the conventional micro tube 1 employing a push stopper lid with hinge is spread through the market as a basic design for the sample storage tube and it is used for various research and development even though there are various types of details in design. With the spread of the conventional micro tube 1 employing a push stopper lid with hinge, most racks and research apparatus employ the specification corresponding to the conventional micro tube 1 as a de facto standard.

Moreover, huge numbers of samples are stored in the past by the conventional micro tube 1. Thus, it is expected that the conventional micro tube 1 employing a push stopper lid with hinge will continue to be used in order to ensure consistency with the stored samples in the past. Prior art 1: JP Tokkai 2007-153446

DISCLOSURE OF THE INVENTION

The Problems to be Solved

As the micro tubes are independent of each other and a large number of storage tubes are arrayed in a storage rack at the same time, it is necessary to identify each storage tube independently. In recent years sample storage tubes that are controlled by printing a barcode or two-dimensional code on the side and/or bottom surface of the storage tube are highlighted, in which various data and/or control information of a sample are encoded, with the barcode or two-dimensional code read in a control process.

The information management is conducted by the printed information code written by laser beam on the surface instead of the readable numeral characters by human eye because the readable numeral character has a risk for human misreading.

There are various contents of the automation processing for handling the micro tube. Various processing is handled by the variety of the automation apparatus. For example, there are the processing for picking up the micro tube from the rack, the processing for transmitting the micro tube, the processing for inserting the micro tube to the rack and the processing for inputting and retrieving the micro tube to the analyzer apparatus. Each micro tube should be accessed and identified in each processing. If the writing processing mechanism for writing the information to each micro tube cannot process the target micro tube handled in the user automation apparatus, the printed information code cannot be given to each micro tube by laser beam appropriately. The correct information management cannot be secured in this case.

Conventionally, it is recommended that olefin-based transparent materials such as polypropylene (PP) which has chemical resistance, relatively high rigidity and thermoplastic properties, is used because it is one of the suitable materials for preserving the sample. The conventional micro tube 1 including the outer figure shown in FIG. 16 employs polypropylene (PP) as the material for the lid 14 because the flange 15 of the lid 14 works as the capping and decapping structure operated by a finger or tool. Polypropylene (PP) has relatively high rigidity. The same as the lid 14, polypropylene (PP) is employed as a material of the tube body 4. Therefore, there is no surface area for writing the information on the conventional micro tube 1. In fact, there is no example for writing the information on the conventional micro tube 1 employing a push stopper lid with hinge by a laser beam.

Especially, it is difficult for writing information by laser beam to the type including the depression portion on the upper surface of the lid because the depression portion exists on the upper surface of the lid.

If the information writable area is secured by sticking a seal on the side surface of the tube body 4, the sticking area becomes opaque, blocking the observability of the stored sample in the tube body 4. In addition, the seal can drop off in the automation system and may cause troubles.

Moreover, while the micro tube is miniaturized, it is difficult to secure enough area for writing the two-dimensional code even if the information writable area is tried to secure by sticking a seal. Especially, it is difficult to stick the information writable area to the micro tube type including the depression portion on the upper surface of the lid because the depression portion exists on the upper surface of the lid.

It is an object of the present invention in view of the above problems to provide a sample storage tube in which the information writable area for the two-dimensional code can be secured on the surface of the sample storage micro tube employing a push stopper lid with hinge. It is another object of the present invention in view of the above problems to provide a sample storage tube in which the printed information code can be written irreversibly without seal sticking. Moreover, it is an object of the present invention to provide the devise of the lid operation, the devise of the enhancing the observability of the sample and the devise of the access operation to the sample.

Means for Solving the Problems

In order to achieve the above-mentioned object, the present invention of a sample storage tube with a hinge for storing a sample in a tube body comprises; a tube body for storing a sample; a push stopper lid for capping the upper opening of the tube body; and a hinge body for connecting the tube body and the push stopper lid; wherein the tube body and the push stopper lid are formed by molding in one piece, in which one portion is formed by light transmissive material and the other portion is formed by opaque material as an information writable area, at least the information writable area by the opaque material is formed on the upper portion of the push stopper lid and the bottom portion of the tube body and at least the information code can be written both on the upper portion of the push stopper lid and the bottom portion of the tube body.

The present invention of a sample storage tube includes a hinge connecting the tube body and the lid and includes an information writable area onto the upper portion of the push stopper lid and the bottom portion of the tube body. In the prior art, there is no example of the conventional sample storage tube with a hinge including the information writable area on the upper portion of the push stopper lid. The present invention is the first case for employing an information writable area onto an upper portion of a push stopper lid.

According to the above-mentioned configuration, the present invention of the sample storage tube with a hinge expands the portion formed by the opaque material from the upper portion of the push stopper lid, the hinge body, and a part of the side portion of the tube body up to the bottom portion of the tube body continuously as one piece.

In the prior art, there is no example of the conventional sample storage tube with a hinge including a portion formed by an opaque material from the upper portion of the push stopper lid, the hinge body, a part of the side portion of the tube body up to the bottom portion of the tube body continuously as one piece. The present invention is the first case for employing an information writable area from the upper portion of a push stopper lid up to the bottom portion of the tube body continuously as one piece.

In the present invention, the hinge body has a dual layer structure comprising the opaque material layer and the light transmissive material layer, wherein the light transmissive material layer locates the inner layer of the curved portion of the hinge body and the opaque material layer is located at the outer layer of the curved portion of the hinge body.

The structural strength is more enhanced by employing the dual layer structure including the relatively high rigidity layer than employing the single layer structure formed of only soft material. The required stretch ability in bending and extending operation becomes large given by the outer layer. Therefore, the inner layer is formed by a light transmissive material and the outer layer is formed by an opaque material.

For example, it is preferable that the opaque material is thermoplastic elastomer resin material having elasticity and the light transmissive material is thermoplastic plastic resin material having relatively large rigidity. In this configuration, the lid is a push stopper lid type. Therefore, the push stopper lid can be fitted into the tube body easily and the airtightness can be obtained easily if the opaque material is employed as either or both the upper opening portion of the tube body and the push stopper lid body which is fitted into the upper opening of the tube body.

Next, the push stopper lid body is described below.

There are two types of the push stopper lid body.

The first type of the push stopper lid body includes a flat figure in its upper surface and a protrusion shape fitting into the upper opening portion of the tube body in its rear side. In this flat type push stopper lid body, the outer edge of the push stopper lid except for the hinge body whose shape is a horseshoe shape is formed by the light transmissive material. The information writable area formed by the opaque material is provided in the center of the upper portion of the push stopper lid. The printed information code is written on the flat surface of the push stopper lid body.

The second type of the push stopper lid body includes a depression portion in the center of its upper surface and a pillar shape fitting into the upper opening portion of the tube body in its rear side. In this depression type of the push stopper lid body, the outer edge of the push stopper lid except for the hinge body whose shape is a horseshoe shape is formed by the light transmissive material. The information writable area is provided on the area except for the outer edge and the hinge body whose shape is a horseshoe shape. Therefore, the information writable area is provided on either or both the flat portion of the upper lid surface around the center depression portion or the bottom surface portion of the center depression portion.

The present invention of the sample storage tube with a hinge can provide a visual effect for assisting the observation of the sample liquid stored in the tube body.

It is preferable that the continuous one piece body on the side portion area of the tube body is a linear band figure whose width is narrower than the inner diameter of the tube body. In this configuration, the difference of the refraction ratio between the liquid and the air is utilized for the sample observation. The width of the opaque band on the side surface of the tube body above the waterline can be observed as it is because there is no large refraction of light in the air above the waterline. In contrast, the width of the opaque band on the side surface of the tube body below the waterline can be observed wider than its real width because there is a relatively large difference of the refraction of light in the liquid under the waterline. By this observation effect, the opaque linear band as the background of the sample comes to look as if there is a difference in its width at the waterline level. Therefore, the observer can recognize the waterline easily.

The present invention can employ the configuration that provides the access method from the outer side to the inner space of the tube body except the method for decapping the upper opening of the tube body.

For example, the present invention employs a soft material portion formed on the lid through which an injection needle can pierce from the upper direction to the inner space of the tube body. The sample stored in the tube body can be accessed by the injection needle from outer side via the soft material portion on the lid.

For example, the present invention employs a soft material portion formed on the bottom portion of the tube body through which an injection needle can pierce from the bottom direction to the inner space of the tube body. The sample stored in the tube body can be accessed by the injection needle from the outer side via the soft material portion on the bottom of the tube body.

The portion of the information writable area for writing a printed information code can be selected among the upper portion of the push stopper lid body, the side portion of the tube body and the bottom portion of the tube body according to the size of the printed information code. For example, the two-dimensional code can be applied to the information writable area on the upper portion of the push stopper lid body and the bottom portion of the tube body because these areas are relatively small. In contrast, the bar-code can be applied to the information writable area on the side portion of the tube body because this area is relatively large to secure a sufficient area. The contents of the information to be encoded in these printed information codes written in the upper portion of the push stopper lid body, the side portion of the tube body and the bottom portion of the tube body can be the same one. If the same information is given to those printed information codes, the same information can be read even if the reading portion is changed according to the posture of the sample storage tube in the rack or in the transmitting state. The contents of the information to be encoded in these printed information codes written in the upper portion of the push stopper lid body, the side portion of the tube body and the bottom portion of the tube body can be the different one. If different information is given to those printed information codes, plural information can be given to the small sample storage tube.

Next, the combination of the printed information code to be given to the information writable area can utilize further improvement.

The sample storage tube with hinge body is small and the information writable area becomes relatively small. Therefore, single printed information code can change into plural pieces of the small printed information codes and each printed information code can be written according to the size of the information writable area.

If the printed information code is selected as a small size that can be written in the information writable area, a plurality of the printed information codes are distributed and can be written in the peripheral portion of the bottom of the tube body. The capacity of the information carried in a printed information code depends on the size of the printed information code. The present invention can employ such small printed information code that cannot carry enough information data for the information to be given to a sample storage tube. The present invention can employ such small printed information code that can carry insufficient data by printing a group of the small printed information codes to the information writable area and the information to be carried in a sample storage tube can be calculated by combining respective encoded information carried by each small printed information code. If the calculated result from a group of the encode information carried by a group of the small printed information code by applying a predetermined algorithm equals the information to be carried in a sample storage tube, such small size printed information code can carry larger data amount by a group of plural small size printed information codes. Especially, if the sample storage tube is a type that has a depression in the center portion of the push stopper lid body and the information writable area is small, the information writable area will be installed to the bottom surface of the depression of the lid or the flat upper surface around the depression. Therefore, a single large information code can replace the combination of plural small sized printed information code, enough information data amount can handle by the combination of plural small sized printed information code.

For example, two-dimension dot code in general use can be employed as the printed information code, and the information to be carried in a sample storage tube is encoded to a combination of the independent small size printed information codes. In this manner, a group of small size printed information codes carrying small data amount is prepared and printed to the information writable area separately.

All small size printed information code in a combination can be the same type of the two-dimension dot code or the different type of the two-dimension dot code.

There are various types of the two-dimension code such as QR code and Data matrix to be employed as the printed information code.

There are several methods for manufacturing the information non-writable area as light transmissive area and the information writable area as opaque area.

The first method is that the information non-writable area and the information writable area are molded by two-color molding method, and at least the information non-writable area is formed by the light transmissive material and the information writable area is formed by the opaque material containing the color former for printing the printed information codes onto the information writable area.

The second method is that the whole sample tube body is molded with the light transmissive material by molding apparatus, and at least the information writable area is coated or printed with the opaque material containing the color former for printing the printed information codes.

Either method can ensure the light transmissive characteristic for the information non-writable area and the coloring characteristic by laser beam for the information writable area.

Effect of the Invention

According to the sample storage tube with hinge body of the present invention, the tube body and the push stopper lid body are connected via the hinge body, the information writable area is secured in the upper surface of the push stopper lid body and the bottom surface of the tube body. Moreover, the area formed by the opaque material including color former expands from the upper portion of the push stopper lid, and the hinge body to a part of the side portion of the tube body up to the bottom portion of the tube body continuously as a one piece body. This continuous one piece information writable area from the upper portion of the push stopper lid to the bottom portion of the tube body is the first case in the world. As the information writable area covers from the upper portion of the push stopper lid, a part of the side portion of the tube body up to the bottom portion of the tube body, the information reading direction can be a variety of directions such as upper direction, side direction and the lower direction. 3-dimensional reading control can be possible.

The structural strength of the hinge body is enhanced by employing the dual layer structure including the relatively high rigidity layer rather than employing the single layer structure made of only soft material.

If the push stopper lid body is a flat type push stopper lid body, the outer edge of the push stopper lid except for the hinge body whose shape is a horseshoe shape is formed by the light transmissive material. The information writable area formed by the opaque material is provided in the center of the upper portion of the push stopper lid. The printed information code is printed onto the flat surface of the push stopper lid body.

If the push stopper lid body is a depression type push stopper lid body, the outer edge of the push stopper lid except for the hinge body whose shape is a horseshoe shape is formed by the light transmissive material. The information writable area is provided on either or both of the flat portion of the upper lid surface around the center depression portion except for the outer edge or the bottom surface portion of the center depression portion. The structural strength of the push stopper lid body can be made large and the information is given by the printed information codes to the flat information writable area on the upper surface of the lid or the flat information writable area in the bottom surface of the depression of the push stopper lid body.

According to the sample storage tube with hinge body of the present invention, the airtightness between the push stopper lid and the tube body can be obtained easily. By the two-color injection molding, the opaque material (such as thermoplastic elastomer resin) having elasticity and the light transmissive material (olefin-based materials such as polypropylene) having relatively large rigidity can be employed at the contact portion between the tube body and the push stopper lid body. The opaque material having elasticity can deform to fill the gap and enhance the airtightness between the tube body and the push stopper lid body. This configuration provides the airtightness effect like that of an O-ring and a gasket.

BRIEF DESCRIPTION OF THE DRAWINGS

FIG. 3 is schematic views of the structure of embodiments of the sample storage tube (decapped state).

FIG. 4-1 is schematic views of the structure of embodiments of the sample storage tube.

FIG. 13 is a schematic view showing the effect of the enhancing the observation for the liquid waterline of the inner stored sample by improving the contrast by the opaque material background by utilizing the refraction.

DETAILED DESCRIPTION OF THE PREFERRED EMBODIMENT

Some embodiments of a sample storage tube with hinge according to the present invention are described below with reference to the relevant drawing. Needless to add, the claims of the present invention include but are not limited to the application, configuration, or quantity shown in the following embodiments.

As shown below, Embodiment 1, 2, 3 and 4 are explained in this order.

Embodiment 1 shows the structure of the sample storage tube 100 of the first pattern. The sample storage tube 100 of the first pattern has the flat type push stopper lid body. This type push stopper lid body includes a flat shape in its upper surface and a protrusion shape fitting into the upper opening portion of the tube body in its rear side.

Embodiment 2 shows the structure of the sample storage tube 100 of the second pattern. The sample storage tube 100 of the second pattern includes the depression type push stopper lid body. This type of the push stopper lid body includes a depression portion in the center of its upper surface and a pillar shape fitting into the upper opening portion of the tube body in its rear side.

Embodiment 3 shows the structure of the sample storage tube which can observe the sample accompanying the visual effect enhancing the observation for the liquid waterline of the inner stored sample by using the opaque material as background.

Embodiment 4 shows the example of the structure including a soft portion in the push stopper lid body through which an injection needle can pierce and the example of the structure including a soft portion in the bottom of the tube body through which an injection needle can pierce.

The abovementioned embodiment is described that the sample storage tubes are manufactured by the two-color injection molding. However, it is not limited to the two-color injection molding method.

Embodiment 1

The sample storage tube 100 in embodiment 1 according to the present invention is described.

Embodiment 1 shows the structure of the sample storage tube 100 of the first pattern. The sample storage tube 100 of the first pattern includes the flat type push stopper lid body.

Figure 1:
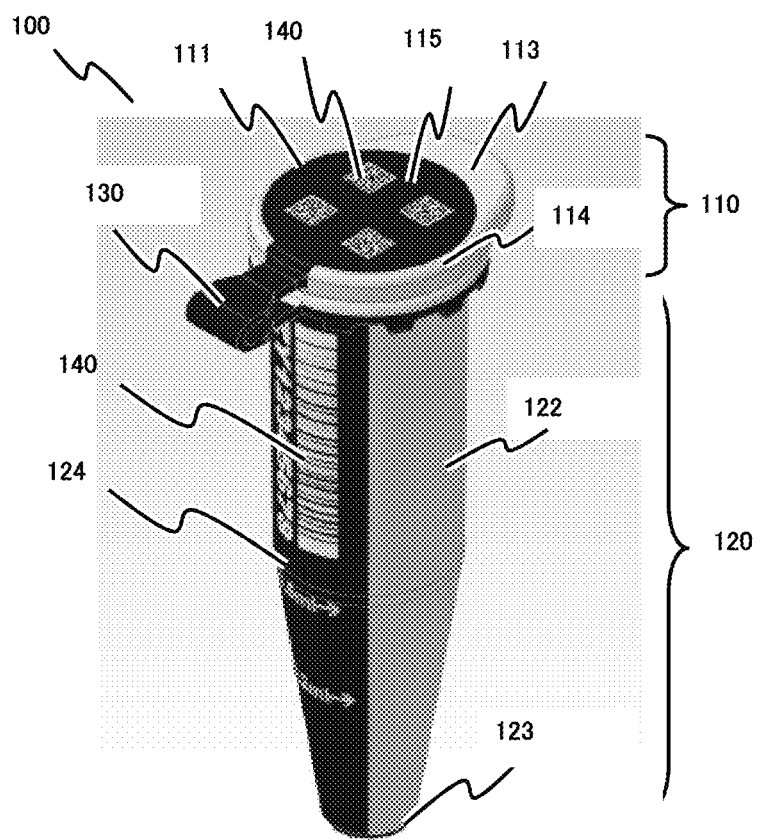
FIG. 1 is a schematic view of the structure of the sample storage tube 100 of the first pattern (capped state).

FIG. 1 is a schematic view of the structure of the sample storage tube 100. FIG. 1 shows the sample storage tube 100 in the capped state.

Figure 2:
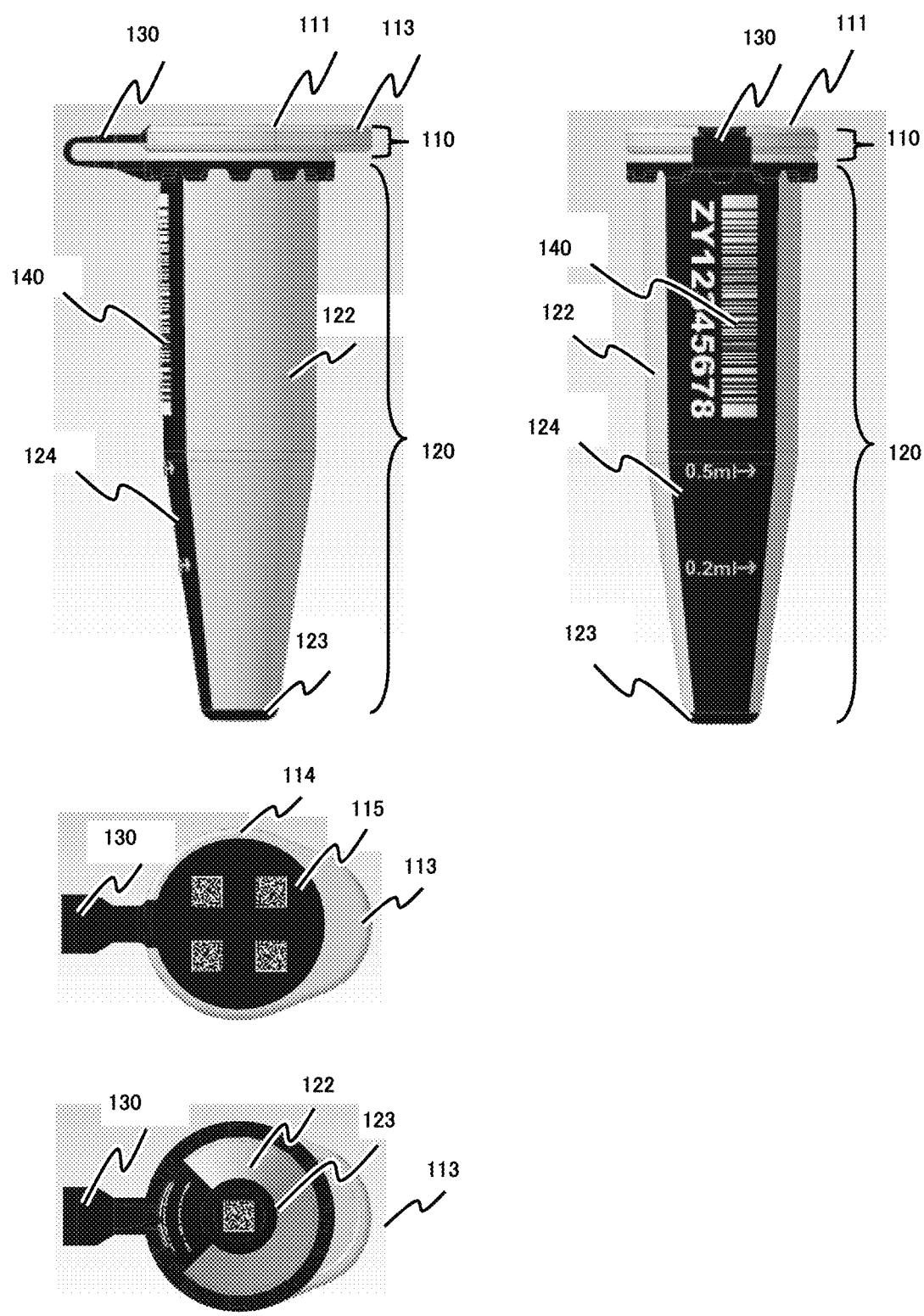
FIG. 2 is a schematic view of the left side view, back view, plan view and the bottom view of the sample storage tube 100 of the first pattern shown in FIG. 1.

FIG. 2 is a schematic view of the left side view, back view, plane view and the bottom view of the sample storage tube 100 in the capped state.

FIG. 3(b) is a schematic view of the structure of the sample storage tube 100 in the decapped state.

Figure 4:
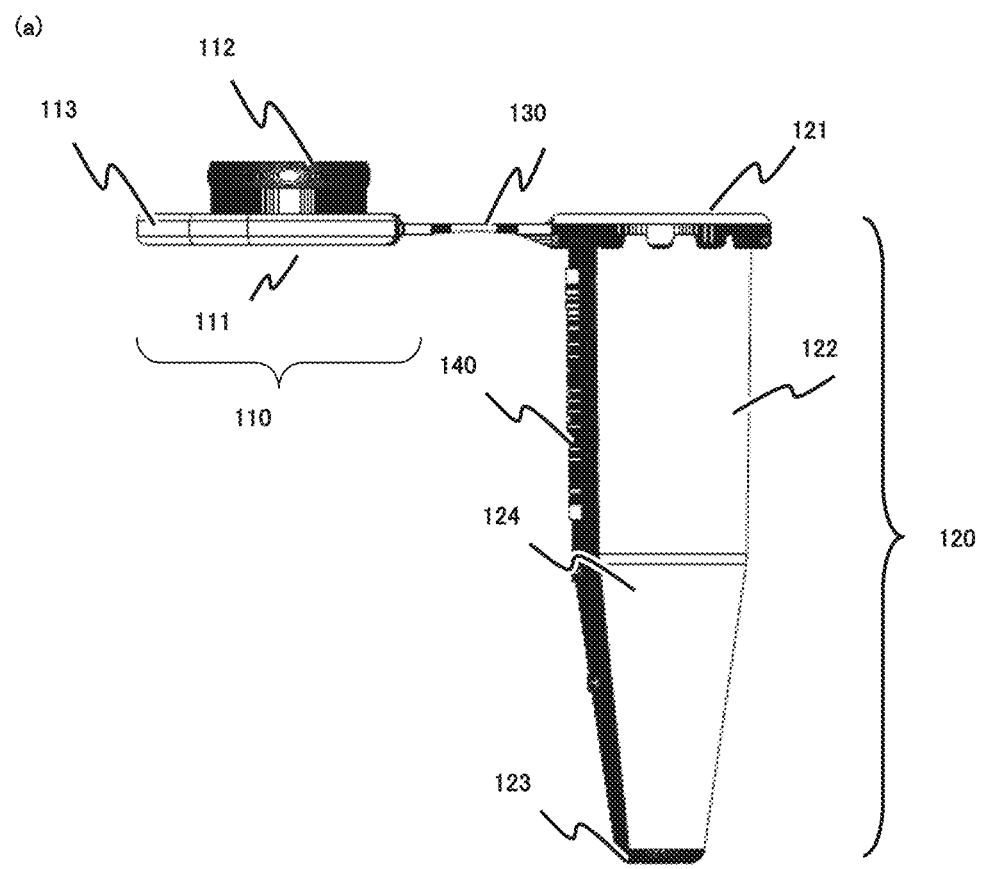
FIG. 4 is a schematic view of the left side view and the vertical cross sectional view of the sample storage tube 100 of the first pattern (decapped state).
Figures 1, 4:
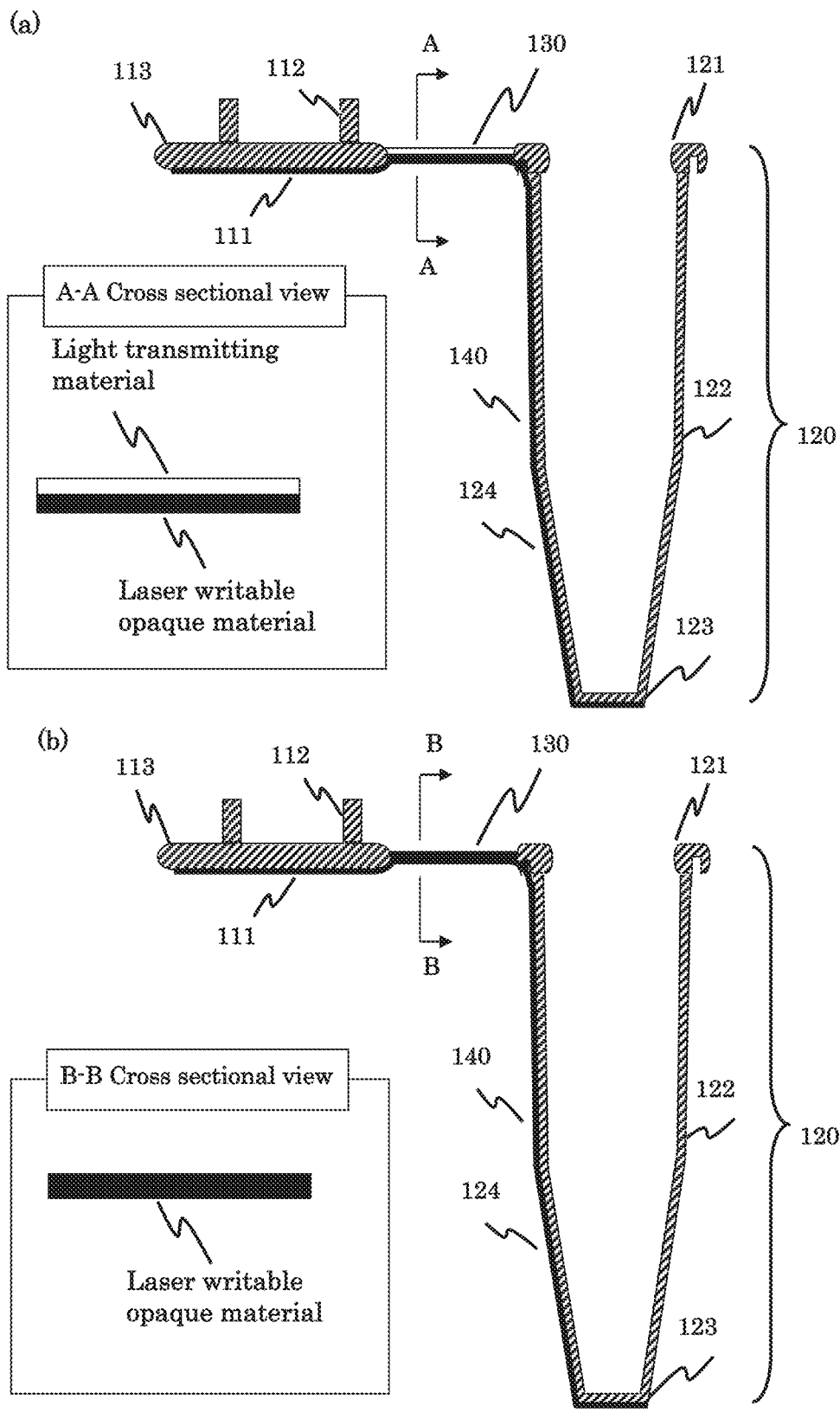

FIG. 4 is a schematic view of the left side view and the vertical cross sectional view of the sample storage tube 100 in decapped state.

As shown in FIG. 1 to FIG. 4, the sample storage tube of the first pattern comprises a push stopper lid body 110, tube body 120 and hinge body 130 and these are formed by molding. In addition, the printed information codes 140 are printed. In this example, the printed information codes are written both on upper surface of the push stopper lid body and the side surface of the tube body. In this example, these printed information codes carry the same information contents.

The push stopper lid body 110 is described below.

The push stopper lid body 110 has a lid structure for capping the upper opening 121 of the tube body 120. The lid 110 is a push stopper lid capped by pushing into the opening of the tube body 120.

For example, the push stopper lid body 110 is a push stopper lid type including the pillar shape and a flange 113 in order to push the lid body with a finger or a mechanical tool easily.

It is preferable that the material of the push stopper lid body 110 is a plastic resin having a chemical resistant property.

For example, a plastic resin (polyolefin material such as polypropylene, polyethylene) having a chemical resistant property is employed. The blend material selected from those materials can be employed as a material. In this example, the material is polypropylene. Polypropylene is an appropriate material as the membrane of the sample storage tube which has a chemical stability and chemical resistance.

The push stopper lid body 110 comprises an upper surface 111, a push stopper body 112, a flange 113, an outer edge 114 and an information writable area 115.

The upper surface 111 is an upper outer surface of the push stopper lid body. The shape of the upper surface 111 is a flat shape in this first pattern. The depression type is described as the second pattern in Embodiment 2.

The push stopper body 112 is a protrusion installed to the inner rear side of the push stopper lid body 110. It is a pillar shape in this example. The outer diameter of the pillar shape fits to the inner diameter of the upper opening 121 of the tube body 120. Therefore, the push stopper body 112 of the push stopper lid body 110 can be pushed into and fit to the upper opening 121 of the tube body 120.

The material of the push stopper body 112 is a softer material having more elasticity than that of the upper opening 121 of the tube body 120. Because of the elasticity, if the push stopper body 112 can be pushed into the upper opening 121 of the tube body 120 and fit to each other, the push stopper body 112 can grip the inner edge of the upper opening 121 firmly.

In contrast, another combination is possible in which the soft material having elasticity is used for the inner edge of the upper opening 121 of the tube body 120 and the hard material having rigidity is used for the push stopper body 112 of the tube body 120.

Moreover, another combination is possible in which the soft material having elasticity is used for both the inner edge of the upper opening 121 of the tube body 120 and the push stopper body 112 of the tube body 120.

The flange 113 is a protrusion as the operating target for flipping up and flopping down the push stopper lid body 110. The flange 113 is formed by the light transmissive material having relatively large rigidity. The shape of the flange 113 is not limited. It is a protrusion shape projecting outward outer than the upper opening 121 of the tube body 120 in order to be operated by a finger or a mechanical tool easily.

The outer edge 114 is an outer edge portion of the push stopper lid body 110 whose shape is a horseshoe shape from the flange 113 to the outer edge of the push stopper lid body 110. It is formed by the light transmissive material having relatively large rigidity. Therefore, the push up power and the push down power applied by a finger or a mechanical tool to the flange 113 is transmitted to the outer edge 114. Therefore, the push stopper lid body 110 should have appropriate rigidity without excessive deformation to flip up and flop down to the upper opening 121 of the tube body 120.

The information writable area 115 is a portion formed by the opaque material to which the information code can be written. Therefore, it is used as the area for printing the information code.

The push stopper lid body 110 in this example includes a flat upper surface 111 in which the information writable area 115 is provided in the center portion. As shown in FIG. 2, the upper surface of the push stopper lid body 110 is covered with information writable area 115 formed by the opaque material in which the information code can be written by laser beam. By this configuration, the information code can be written in the information writable area 115 on the upper surface 111. In this first pattern, the push stopper lid body 110 includes a flat type upper surface 111, so the information can be written by laser beam easily.

In this present invention, the information writable areas are provided to at least both the upper surface of the push stopper lid body and the bottom surface of the tube body. The information code can be written on both the upper surface of the push stopper lid body and the bottom surface of the tube body.

In the example shown by FIG. 1 to FIG. 4, the information writable area expands from the information writable area 115 on the upper surface of the push stopper lid body 110, the hinge body 130, the information writable area 124 on the side surface of the tube body 120 up to the information writable area on the bottom surface 123 of the tube body 120 continuously as one piece. In the prior art, there is no example of the conventional sample storage tube including the same structure as that of the present invention that an opaque material expands from the upper portion of the push stopper lid 110 to the hinge body, a part of the side portion of the tube body 120 and the bottom portion of the tube body 120 continuously as one piece.

For example, the opaque material employed as the information writable area is elastomer belonging to thermoplastic elastomer resin material having both rubber like elasticity and resin like characteristics.

The information writable area 115 has the color former turning from black to white kneaded to the basic elastomer resin material. In this example, the original color of the color former is black. The portion irradiated by laser beam changes its color from black to white, and the printed information code 140 is written in there.

Hereinafter, the example of the color former is described.

The color former has photo-sensitivity to the light wavelength of the laser beam or heat-sensitivity. The color former colors its color by changing its physical characteristic or chemical characteristic when receiving the particular wavelength laser beam.

As the color former for the information writable area of the present invention, any color former that satisfies the above condition may be employed. For example, carbon black, lower titanium oxide and silicon containing compound can be selected.

The color former including carbon black, lower titanium oxide and silicon containing compound, can color and turn white clearly only where the laser beam having particular wavelength is irradiated even though its original color is black.

The mechanism for coloring as follows. The color former including carbon black, lower titanium oxide and silicon containing compound shows its original base color of the product as black mainly coming from carbon black. When receiving a particular wavelength laser beam, white color emerges by decolorization of carbon black and oxidization reaction of the lower titanium oxide to $TiO_2$ whose color is white. In addition, the silicon containing compound assists the white coloring reaction. There are other materials that can be employed as the color former having photo-sensitivity or heat-sensitivity that changes its physical characteristic or its chemical characteristic by the particular wavelength laser beam. No matter what the coloring mechanisms are known, materials as color formers can be employed in this present invention are exist. This invention is certainly and firmly performed. The skilled person in this technical field can select color former of the present invention. The material currently developed and the material to be developed in the future can be employed as color former such as the material turning from black to white by photo-sensitivity, the material turning from transparent to white by photo-sensitivity, the material turning from black to white by heat-sensitivity, and the material turning from transparent to white by heat-sensitivity.

Regarding carbon black, carbon black can be classified as furnace black, channel black and thermal black by its production process, and as acetylene black, ketjenblack, oil black and gas black by its raw material. These materials can be employed as the color former of the present invention.

Regarding the lower titanium oxides, there are lower titanium oxides described as $Ti(n)O(2n-1)$ (n=1, 2, 3) such as titanium monoxide, titanium dioxide, dititanium trioxide and trititanium pentoxide, or lower titanium oxides described as $TiO(m)$ (m=1 to 1.99). Regarding black titanium oxide, it is described as $TiO(n)$ (n=1 to 1.9).

Regarding the silicon containing compound, organic silicon containing compounds such as dimethylpolysiloxane, tetramethoxysilane, silicon ether, silicon ester, or inorganic silicon containing compounds such as silicon dioxide, navy blue, silicon carbide and silicon nitride can be employed. A mixed compound of plural silicon containing compounds such as dimethylpolysiloxane and silicon dioxide can be employed.

Regarding the amount of the color former added, it is preferable that 0.0005 to 5 pts.mass, more preferably 0.01 to 3 pts.mass, furthermore preferably 0.05 to 1 pts.mass is added to transparent plastic material at 100 pts.mass. Enough contrast cannot be obtained if the color former is less than 0.0005 pts.mass. The contrast is deteriorated by the color former at more than 5 pts.mass because of energy over-absorption.

The amount of each of carbon black, lower titanium oxide and silicon containing compound in the added amount of the color former B is as follows. It is preferable that the added amount of carbon black is 0.0001 to 2 pts.mass, more preferably 0.005 to 1 pts.mass, furthermore preferably 0.02 to 0.5 pts.mass added to transparent plastic material at 100 pts.mass. It is preferable that the added amount of lower titanium oxide is 0.0001 to 2 pts.mass, more preferably 0.005 to 1 pts.mass, furthermore preferably 0.02 to 0.5 pts.mass added to transparent plastic material at 100 pts.mass. It is preferable that the added amount of silicon containing compound is 0.0001 to 5 pts.mass, more preferably 0.005 to 5 pts.mass, furthermore preferably 0.02 to 4 pts.mass added to transparent plastic material at 100 pts.mass.

Other colorant such as inorganic pigment, organic pigment and dye can be added. White coloring can be adjusted by the additional colorant.

Depending on the color adjustment, releasing agent, stabilizer, antioxidant, ultraviolet light absorbent and enriching agent can be added.

Next, the tube body 120 is described.

The tube body 120 is a container for storing the sample. In this example, a tube-like container including an information writable area 123 on the bottom surface can be employed as the tube body 120. The shape is not limited.

Regarding the height of the tube body 120, it is preferable that the tube body is higher than the grid plate of the rack. The sample storage tube 100 is inserted to and picked up from the rack repeatedly. If the upper portion of the tube body 120 is projecting from the rack top surface, the sample storage tube body can be accessed easily by the robot arm.

In this example, the tube body 120 comprises an upper opening 121, a tube base body 122, a bottom surface 123 and an information writable area 124. The tube body 120 may include a gasket.

The upper opening 121 is an opening of the tube body 120. The diameter of the upper opening 121 is not limited. In this example, the diameter size of the upper opening 121 fits to the outer diameter of the push stopper lid body 110. The push stopper lid body 110 can work as a push stopper lid and the inner space of the tube body can be airtight.

The tube base body 122 is a tube like container base for containing the sample. The tube base body 122 is formed by light transmissive material to observe the sample stored in it.

It is preferable that the material of the tube base body 122 is light transmissive glass or plastic resin to observe the preserved state of the enclosed sample. The plastic resin has chemical resistance. For example, it is selected from the group consisting of polypropylene and polyethylene. The blended combination of plural plastic resins can be employed. In this example, the material is polypropylene. Polypropylene is one of the preferable materials for the sample storage tube, which is chemically stable and has high chemical resistance and high transparency. In addition, polypropylene has appropriate rigidity, so the appropriate structural strength can be obtained.

The tube base body 122 is formed by the light transmissive material which does not contain the color former. Therefore, the tube base body 122 works as information non-writable area in which printed information code cannot be written. No printed information code is written in the non-writable area and it can work as a window through which the stored sample can be observed.

A part of the tube base body 122 is the information writable area 124 formed by the opaque material molded with the remaining part of the tube base body 122 as one body. By using the two-color molding method, the base figure is molded first with light transmissive material and the remaining part for the information writable area 124 is molded second with opaque material to which information code can be written by laser beam.

Next, the bottom surface 123 is described.

The bottom surface 123 is an end portion for enclosing the bottom portion of the tube body 120. In this example, the bottom surface is covered with the information writable area 124 formed by the opaque material for writing the information code by laser beam. In this configuration, the printed information code can be written in the bottom surface 123.

The outer shape of the tube body 120 is narrowed down to the bottom surface 123, and the area of bottom surface 123 is small. However, due to the laser printing technology, the printed information code can be written precisely and can be read accurately, so the printed information code can be written to such a small size bottom surface.

The position of the resin molding port (gate) is selected to avoid the bottom portion in the two-color molding procedure. Therefore, the bottom surface portion can be protected as a vacant space in the first molding procedure and can be filled with the opaque material in the second molding procedure of the two-color molding steps.

The information writable area 124 is installed to both a part of the side surface and the bottom surface arrayed vertically. In this example, the information writable area 124 is extended from the upper end of the side surface up to the bottom surface continuously as one band body. In this example, the side surface can be regarded as a band shape, and the one dimensional information code such as bar code and numeric signal can be printed in the side surface because the information writable length can be secured longer in the vertical axis direction than width direction. In contrast, the two-dimensional information code such as QR Code™ and DATAMATRIX™ can be printed in the bottom surface because the information writable area is small.

The opaque material applied to the information writable area 124 can be the same opaque material as that of the information writable area 115. In this example, the opaque material is a blended material in which the black material base is thermoplastic elastomer resin material having elasticity such as TPE and the additive material is color former agent that can turn its color from black to white by laser irradiation. In this example, the material for the information writable area 124 is the same as that of the information writable area 115. The opaque material is black before coloring reaction. After irradiating the laser beam, the irradiated portions turn its color from black to white and the information code can be printed.

Regarding the color former agent, it can be the same material described in information writable area 115, and further description is omitted here.

Next, the hinge body 130 is described below.

The hinge body 130 is a member for connecting the push stopper lid body 110 and the tube body 120. It is employed in what is called the "sample storage tube with hinge". The hinge body 130 deforms according to the opening-closing operation of the push stopper lid body 110. Therefore, the hinge body 130 is made of flexible material having deformation properties to follow the opening-closing operation and having elasticity and the structural strength to avoid being cut since the fragment can be dropped in the automation apparatus and cause the system failure.

The hinge body 130 of the present invention can employ the dual structure.

The merit for the dual structure of the hinge body 130 is as follows. The first merit is that the dual structure can provide an opaque material layer connecting between the push stopper lid body 110 and the tube body 120, so it is suitable for applying the two color molding process. The second merit is that the dual structure can provide two different characteristics for the flexibility properties and the structural strength properties simultaneously. The inner layer can provide the structural strength properties with the light transmissive material having relatively large rigidity and the outer layer can provide the flexibility properties with the opaque material having elasticity and flexibility.

In this example, the inner layer is light transmissive material having relatively large rigidity as shown in FIG. 3(a) and FIG. 4-1(a), and the outer layer is the opaque material having elasticity and flexibility as shown in FIG. 1 and FIG. 4-1(a). In this example, it is easy to form the opaque material as the outer layer of the hinge body 130 because the opaque material is formed continuously from the information writable area 115 of the push stopper lid body 110 to the hinge body 130, and the information writable area 124 up to the information writable area on the bottom surface 123 as one piece.

It is also possible to form hinge body 130 with opaque material only as shown in FIG. 3 (b) and FIG. 4-1 (b).

In contrast, it is possible to form the inner layer with opaque material having elasticity and flexibility and the outer layer with the light transmissive material having relatively large rigidity. The inverse dual structure of the hinge body can be possible.

Next, the printed information code 140 is described below.

The printed information code 140 is a printed figure carrying the encoded information including one-dimension code such as bar-code and two-dimensional code such as QR Code™ and DATAMATRIX™.

In this configuration, the area of the information writable area 115 on the push stopper lid body 110 is small and difficult to secure enough length, so the two-dimensional code such as QR Code™ and DATAMATRIX™ are suitable. In contrast, the information writable area 124 on the side surface of the tube body 120 is a band shape and easy to secure enough length, so the one-dimensional code such as bar-code can be printed. The area of the information writable area on the bottom surface 123 is small and difficult to secure enough length, so the two dimensional dot code such as QR Code™ and DATAMATRIX™ are suitable.

Large amounts of data information can be applied to a sample storage tube 100 by printing plural printed information codes 140 and calculating the large amount of data information by using a predetermined algorithm processing. In this method, the data amount of the encoded information carried by each printed information code 140 is smaller than that of the information to be applied to a sample storage tube 100. However, plural encoded information carried by the plural printed information codes 140 are combined and calculated to re-build the larger information by using a predetermined algorithm processing.

The configuration of the sample storage tube 100 of Embodiment 1 is shown above. According to the sample storage tube 100 of Embodiment 1, the push stopper lid body 110 employs a flat type upper surface. Therefore, the upper surface of the push stopper lid body 110 can secure the large area for the information writable area 115 with the opaque material and information writable area 124 formed with the opaque material can extend to the side surface and bottom surface of the tube body 120 via the hinge body 130. The sample storage tube 100 of the present invention can provide a larger information writable area from the upper surface of the push stopper lid body to the side surface of the tube body and the bottom surface of the tube body even if the sample storage tube is small.

Embodiment 2

The sample storage tube 100a in embodiment 2 according to the present invention is described.

Embodiment 2 shows the structure of the sample storage tube 100a of the second pattern. The sample storage tube 100a of the second pattern includes the push stopper lid body with the depression in the center. The push stopper lid body of the second type includes a depression portion in the center of its upper surface and a pillar shape fitting into the upper opening portion of the tube body in its rear side.

Figure 5:
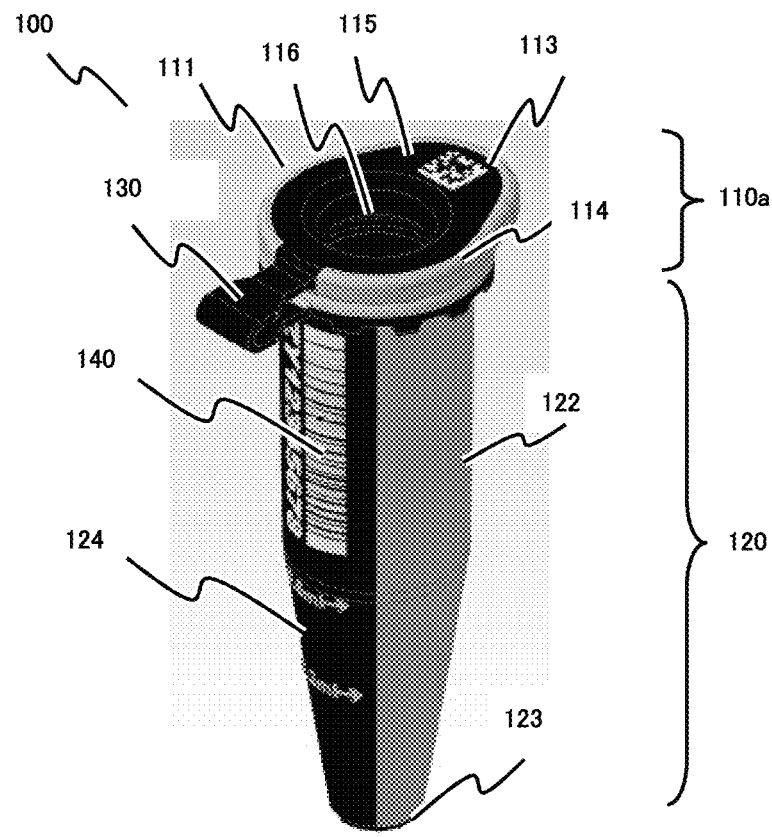
FIG. 5 is a schematic view of the structure of the sample storage tube 100 of the second pattern (example of the information printed code is printed in a part of the flat surface).

FIG. 5 is a schematic view of the structure of the sample storage tube 100a of the second pattern. FIG. 5 shows the sample storage tube 100a in the capped state.

Figure 6:
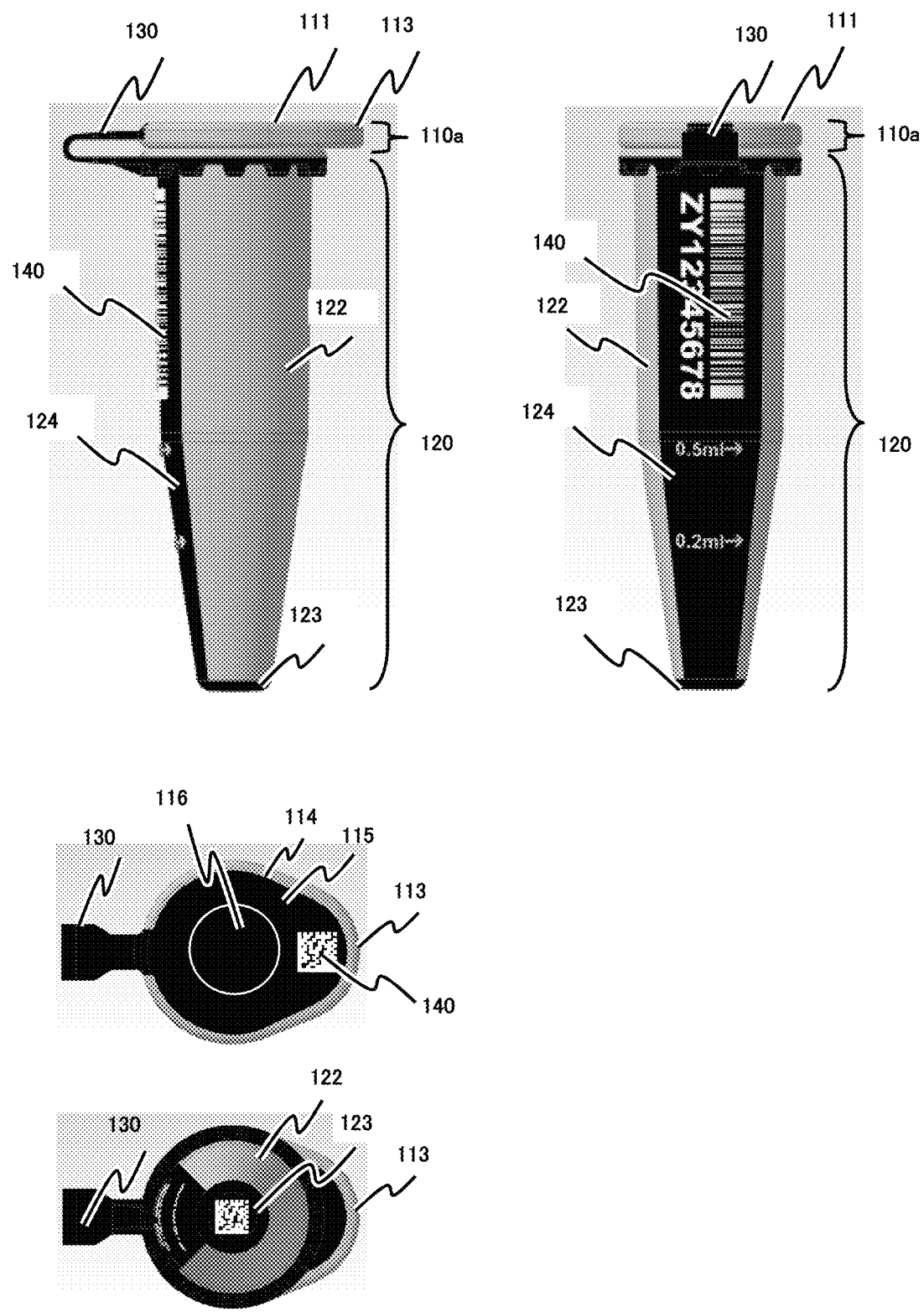
FIG. 6 is a schematic view of the left side view, back view, plan view and the bottom view of the sample storage tube 100 of the second pattern shown in FIG. 5.

FIG. 6 is a schematic view of the left side view, back view, plane view and the bottom view of the sample storage tube 100a in the capped state.

Figure 7:
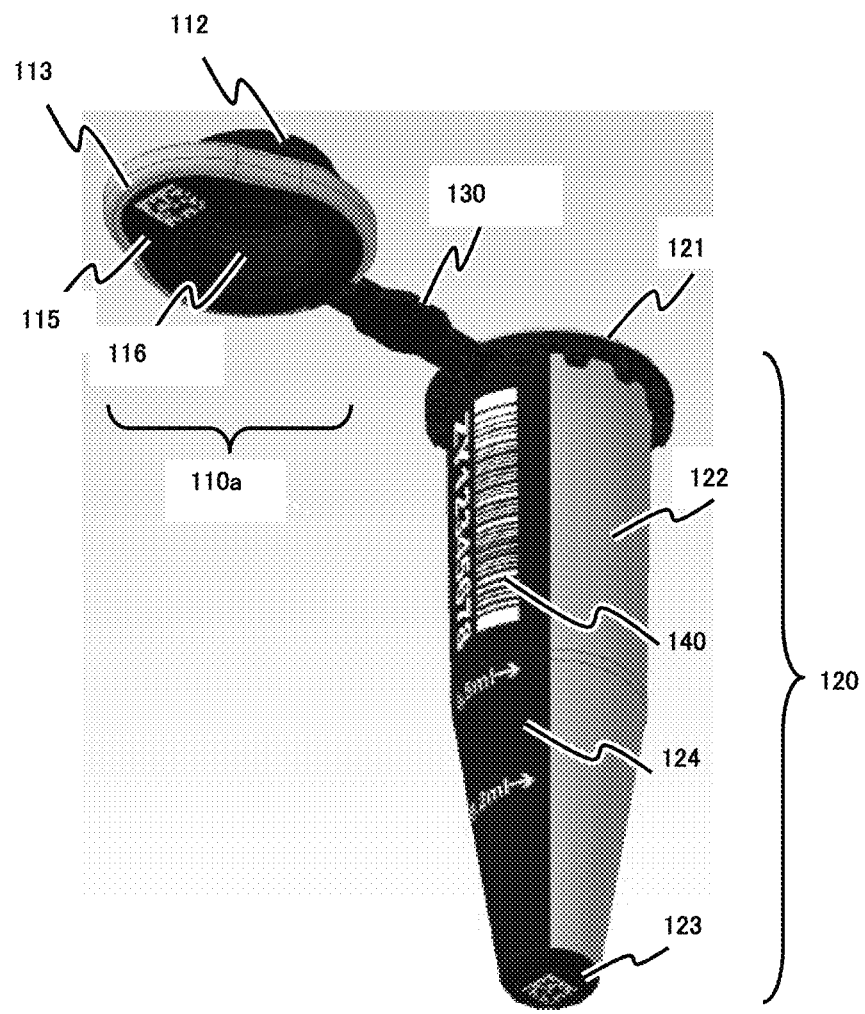
FIG. 7 is a schematic view of the structure of the sample storage tube 100 of the second pattern (decapped state).

FIG. 7 is a schematic view of the structure of the sample storage tube 100a in the decapped state.

Figure 8:
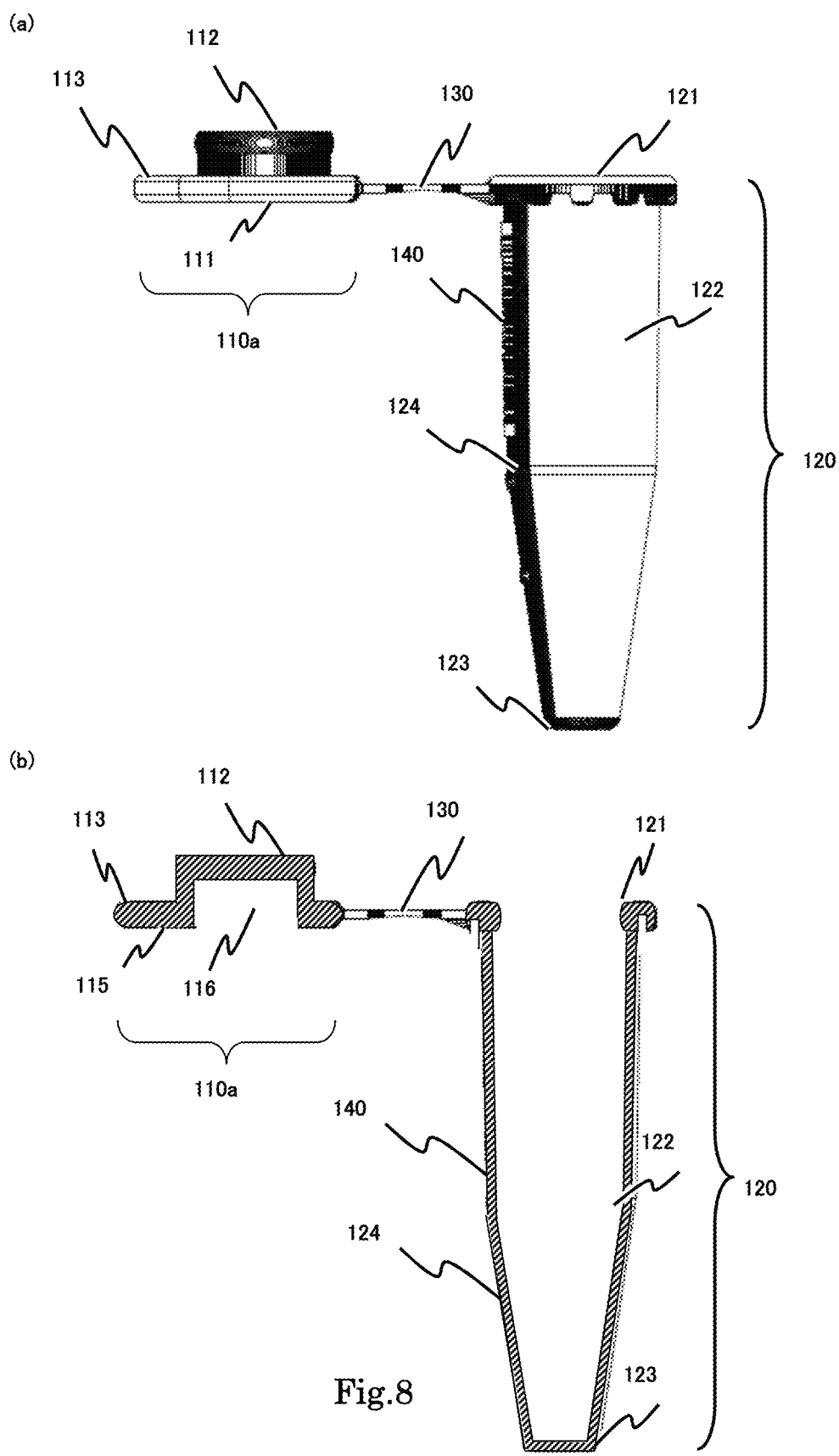
FIG. 8 is a schematic view of the left side view and the vertical cross sectional view of the sample storage tube 100 of the second pattern (decapped state) shown in FIG. 7.
Figure 9:
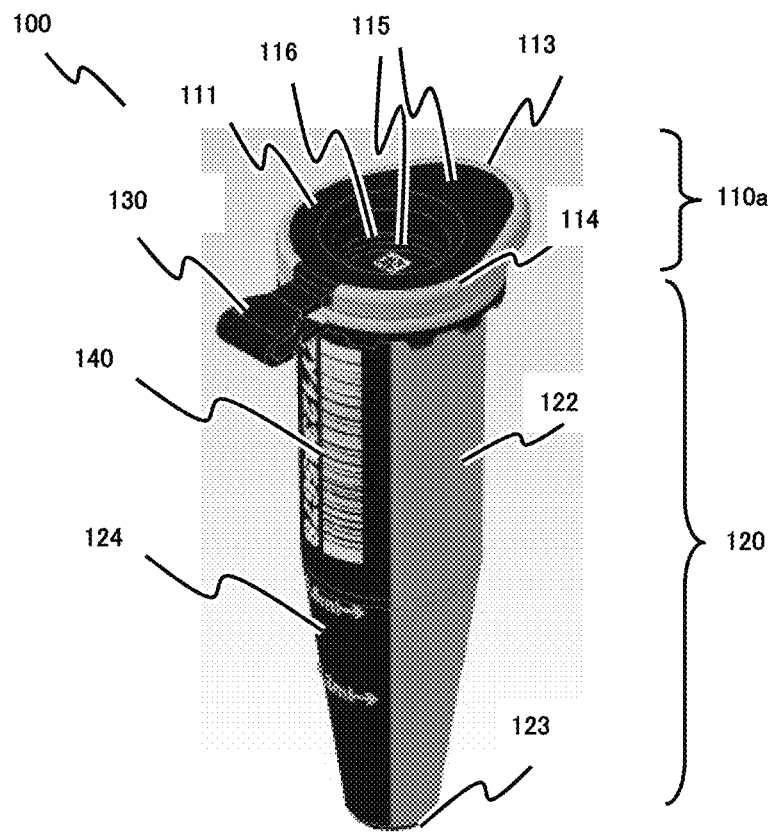
FIG. 9 is a schematic view of the structure of the sample storage tube 100 of the second pattern (example of the information printed code is printed in the bottom surface).
Figure 10:
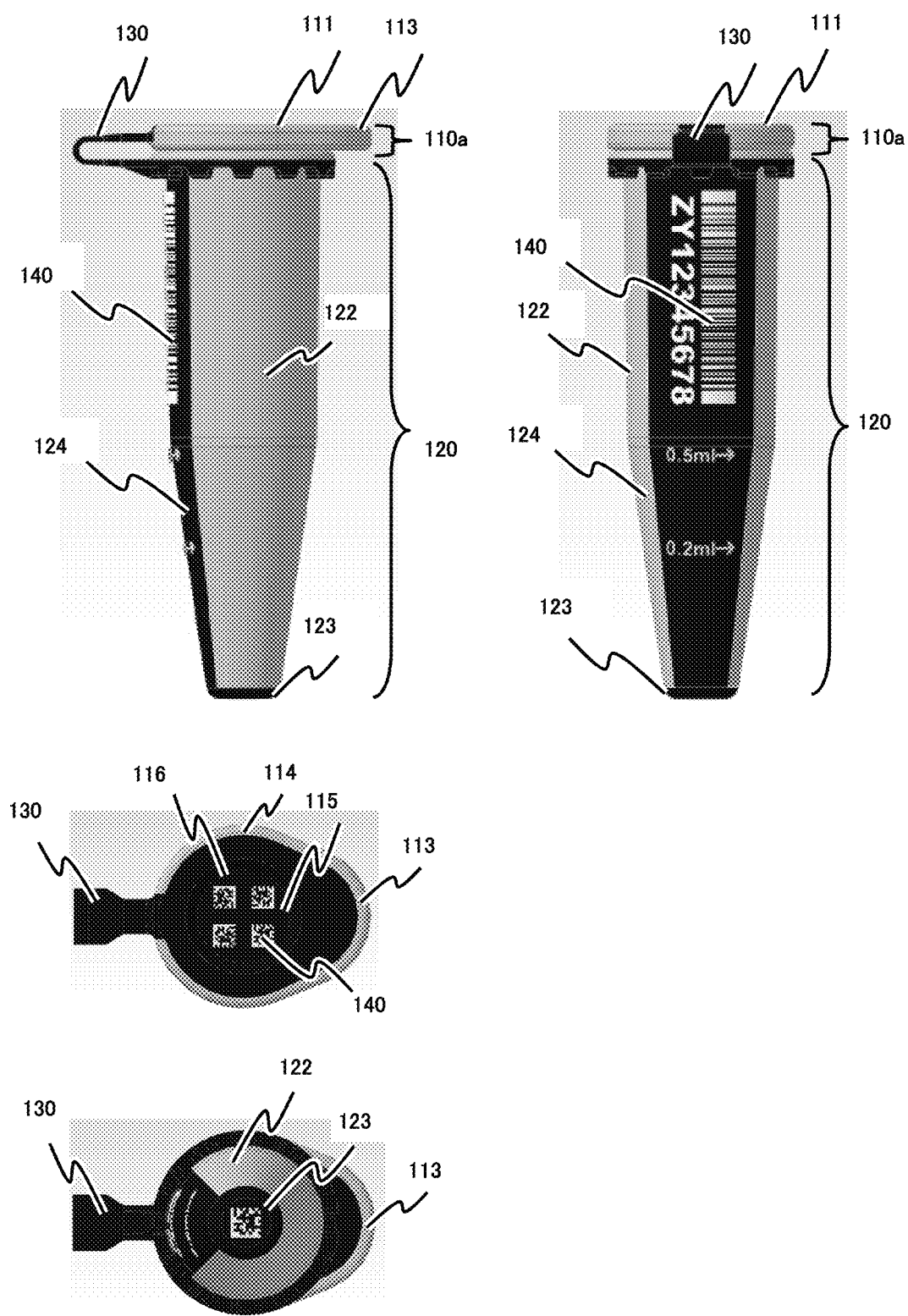
FIG. 10 is a schematic view of the left side view, back view, plan view and the bottom view of the sample storage tube 100 of the second pattern shown in FIG. 9.
Figure 11:
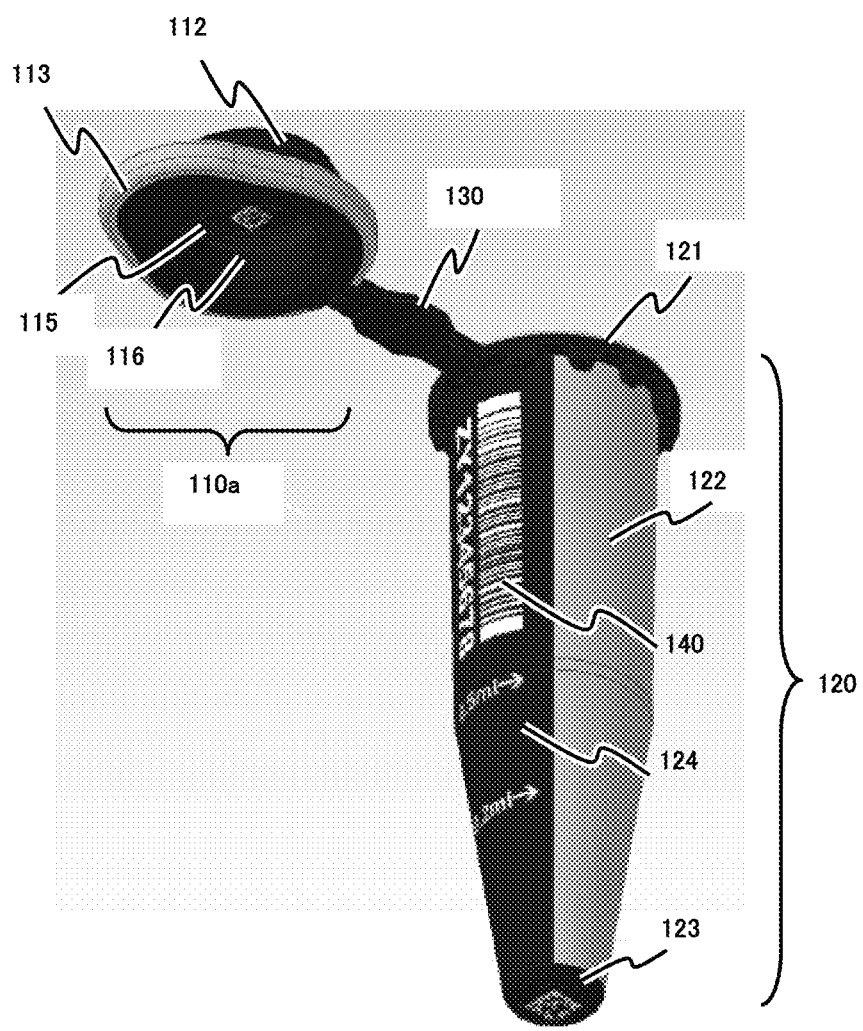
FIG. 11 is a schematic view of the structure of the sample storage tube 100 of the second pattern (decapped state).
Figure 12:
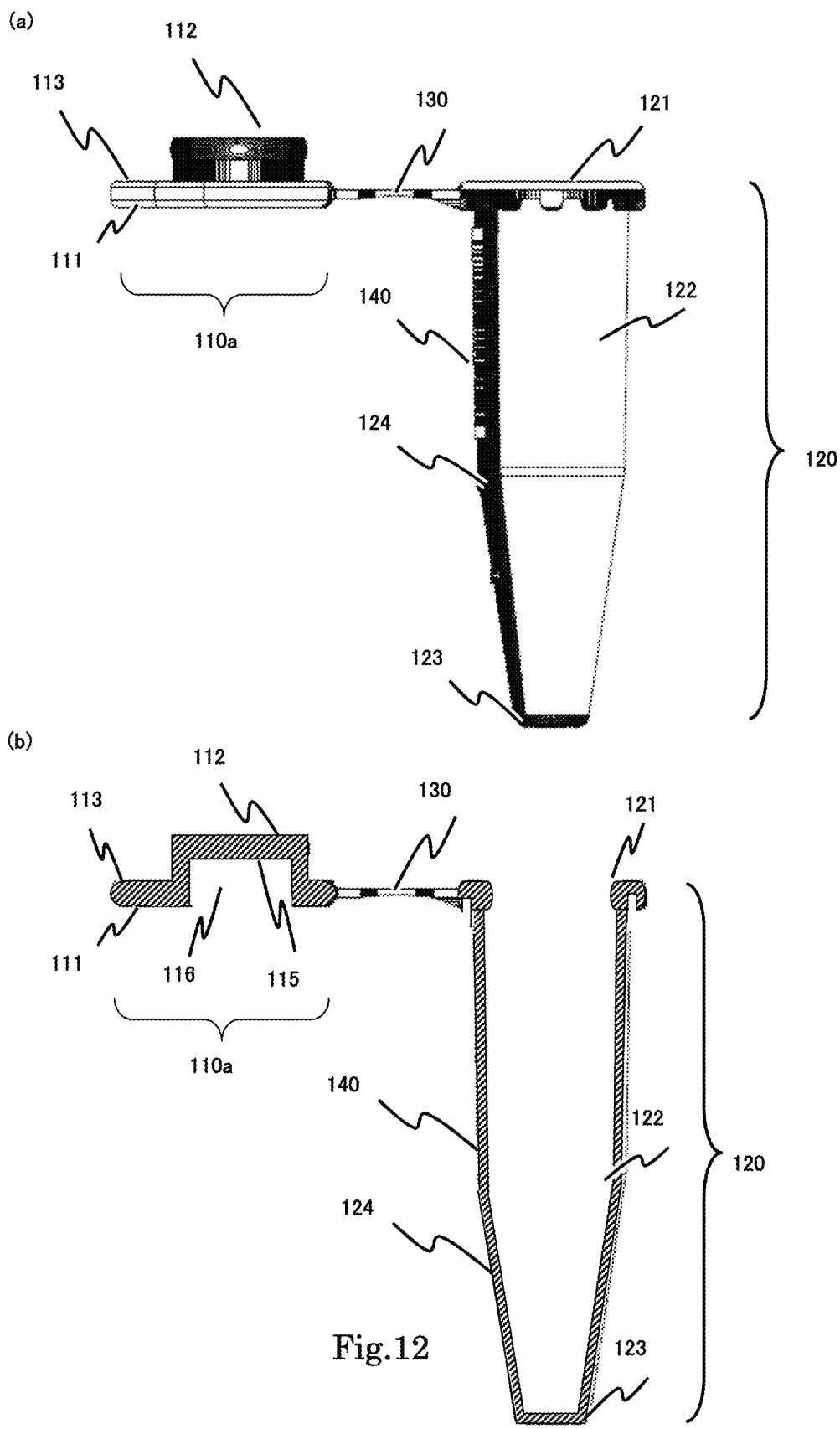
FIG. 12 is a schematic view of the left side view and the vertical cross sectional view of the sample storage tube 100 of the second pattern (decapped state) shown in FIG. 11.

FIG. 8 is a schematic view of the left side view and the vertical cross sectional view of the sample storage tube 100a in the decapped state.

As shown in FIG. 5 to FIG. 8, the sample storage tube 100a of the second pattern comprises a push stopper lid body 110a, tube body 120 and hinge body 130 and these are formed by molding as one body. In addition, the printed information codes 140 are printed. In this example, the printed information codes are written both on the upper surface of the push stopper lid body and the side surface of the tube body.

In this example, the tube body 120, hinge body 130 and the printed information code 140 except for the push stopper lid body 110a are the same as those of Embodiment 1, so the description thereof is omitted here.

The push stopper lid body 110a is described below.

The push stopper lid body 110a includes a depression 116 in the center portion of the upper surface and a pillar shape 112 fitted into the upper opening 121 of the tube body 120 at the bottom portion of it. The lid 110a is a push stopper lid type capped by pushing into the opening of the tube body 120.

As shown in FIG. 5 to FIG. 8, the push stopper lid body 110a of the second pattern comprises an upper surface 111, a push stopper body 112, a flange 113, an outer edge 114, an information writable area 115 and a depression 116.

The upper surface 111 is an outer surface of the push stopper lid body. The shape of the upper surface 111 includes a flat shape portion around the depression 116 in this second pattern.

The push stopper body 112 is a protrusion installed inner rear side of the push stopper lid body 110a. It is a pillar shape in this example. The outer diameter of the pillar shape fits to the inner diameter of the upper opening 121 of the tube body 120. Therefore, the push stopper body 112 of the push stopper lid body 110a can push into and fit to the upper opening 121 of the tube body 120.

The flange 113 and the outer edge 114 are the same as those of embodiment 1.

The information writable area 115 is an information writable area formed by opaque material for writing information code.

In this example, there is a flat shape upper surface 111 around the depression 116 in the center of the push stopper lid body 110a. The information writable area 115 is installed to the upper surface 111. As shown in FIG. 5 and FIG. 6, the upper surface 111 of the push stopper lid body 110a is covered with the information writable area 115 formed by the opaque material to which the printed information code 140 can be written by laser beam. In this example, the upper surface 111 of the push stopper lid body 110a of this second pattern is a flat shape, so it is easy to write the printed information code by laser beam.

In the example shown in FIG. 5 to FIG. 8, the information writable area 115 formed by the opaque material of this second pattern expands its area continuously from an information writable area 115 of the upper portion 111 of the push stopper lid 110a to the hinge body 130 and an information writable area 124 of the side portion of the tube body 120 and the information writable area of the bottom portion 123 of the tube body 120 as one piece.

For example, the opaque material applied to the information writable area 115 is the same opaque material as that of embodiment 1. In this example, the opaque material is a blended material whose black material base is thermoplastic elastomer resin material having elasticity and the additive material is color former agent that can turn its color from black to white by laser irradiation. The opaque material is black before the coloring reaction. After irradiating the laser beam, the irradiated portions turn their color from black to white and the information code 140 can be printed.

The printed information code 140 is the same as that of embodiment 1. The information writable area can be large in the upper surface 111 in embodiment 1. However, the upper surface 111 of the push stopper lid body 110a for the information writable area becomes narrower because there is the depression 116 in the center portion.

Next, the example in which the information writable area is provided at the bottom surface of the depression 116 of the push stopper lid body 110a and the example in which the printed information code is written in there are described below.

Embodiment 2 shows the sample storage tube 100a including the depression type push stopper lid body. This type of the push stopper lid body 110a includes a depression portion 116 providing the information writable area.

FIG. 9 to FIG. 12 show the example in which the information writable area is provided on the bottom of the depression 116 of the push stopper lid body 110a.

This type of the push stopper lid body 110a includes a depression portion 116 in the center of its upper surface and a pillar shape 112 fitting into the upper opening portion 121 of the tube body 120 in its rear side.

In this example, the upper surface 111, the push stopper body 112, the flange 113 and the outer edge portion 114 are the same those of embodiment 1.

The information writable area 115 is an information writable area formed by opaque material for writing information code. In this example, the information writable area 115 is provided at the bottom surface of the depression portion 116 in the center portion of the push stopper lid body 110a. In the plan view shown in FIG. 9, FIG. 10 and the vertical cross-sectional view shown in FIG. 12, the bottom surface of the depression portion 116 is covered with the information writable area 115 formed by opaque material in which the printed information code can be written. The bottom surface of the depression portion 116 is flat in this example, it is easy to write the printed information code even though it is located in a deep place.

In the example shown in FIG. 9 to FIG. 12, the information writable area expands continuously from the information writable area 115 on the bottom surface of the depression portion 116 of the push stopper lid body 110a to the flat surface of the upper surface around the depression portion 116, the hinge body 130, and the information writable area 124 as a part of the side surface of the tube body 120 up to the information writable area on the bottom surface 123 of the tube body 120 as one piece.

Embodiment 3

Embodiment 3 shows the example of the sample storage tube in which one can observe the inner sample with the visual effect of enhancing the observation for the liquid waterline of the inner stored sample.

The example shown in Embodiment 1 and Embodiment 2 employs the information writable area expanding continuously from the upper surface of the push stopper lid body to the hinge body and the side surface of the tube body up to the bottom surface of the tube body as one piece. Embodiment 3 changes the information writable area formed by opaque material on the side surface of the tube body to be narrower and utilizes it as the background of the inner stored sample in observation. If the inner stored sample is observed from the opposite side of the information writable area on the side surface of the tube body as it becomes the background against the sample, the information writable area 124 formed by opaque material can work as a background through the sample. If the width of the background is narrower than the diameter of the tube body, a superior visual effect can be obtained because the width of the opaque band can be seen as if there is a difference in its width at the waterline level because of the difference in refraction of light.

FIG. 13 (a) is a schematic view showing the observation result of the inner sample liquid stored in tube body 120 utilizing the opaque band as the background in which the width of the information writable area is narrower than the inner diameter of the tube body (For example, it ¼ to ⅙ of the circumference length of the tube body).

As shown in FIG. 13 (a), the width of the opaque band on the side surface of the tube body upper than the waterline can be observed as it is because there is no large refraction of light in the air upper than the waterline. In contrast, the width of the opaque band on the side surface of the tube body lower than the waterline can appear wider than its real width because there is a relatively large difference of the refraction of light in the liquid under the waterline. By this visual effect, the opaque linear band as the background of the sample looks as if there is a difference in its width at the waterline level.

By this visual effect, the width of the opaque band change at the waterline level and the contrast becomes clearly. It is easy for the observer to recognize the waterline.

FIG. 13 (b) is a schematic view showing the observation result of the inner sample liquid stored in tube body 120 from the side direction of the tube body 120 to prevent from overlapping the opaque band as the background.

As shown in FIG. 13 (b), the width of the opaque band on the side surface of the tube body upper than the waterline can be observed as it is because there is no large refraction of light in the air above the waterline. The width of the opaque band on the side surface of the tube body lower than the waterline can be observed as it is because there is no opaque band background. The visual effect shown by FIG. 13 (a) is not obtained in FIG. 13 (b) because there is no opaque band background. FIG. 13 (a) is suitable for recognizing the waterline, FIG. 13 (b) is suitable for observing the state of the stored sample.

As shown above, if the width of the opaque band of the information writable area 124 is narrower than the inner diameter of the tube body 120, for example ¼ to ⅙ of the circumference length of the tube body, the visual effect shown in FIG. 13 (a) is obtained by observing the inner sample with the opaque band as the background.

Embodiment 4

Embodiment 4 shows the example of the structure including the soft portion in the push stopper lid body through which an injection needle can pierce and the example of the structure including the soft portion in the bottom of the tube body through which an injection needle can pierce.

The push stopper lid body 110 of the present invention can open its upper opening by flipping up the flange 113. The inner sample can be accessed via the upper opening.

However, there is a request for accessing the inner sample by piercing the injection needle from outside without opening the upper opening 112 by flipping up the flange 113.

Figure 14:
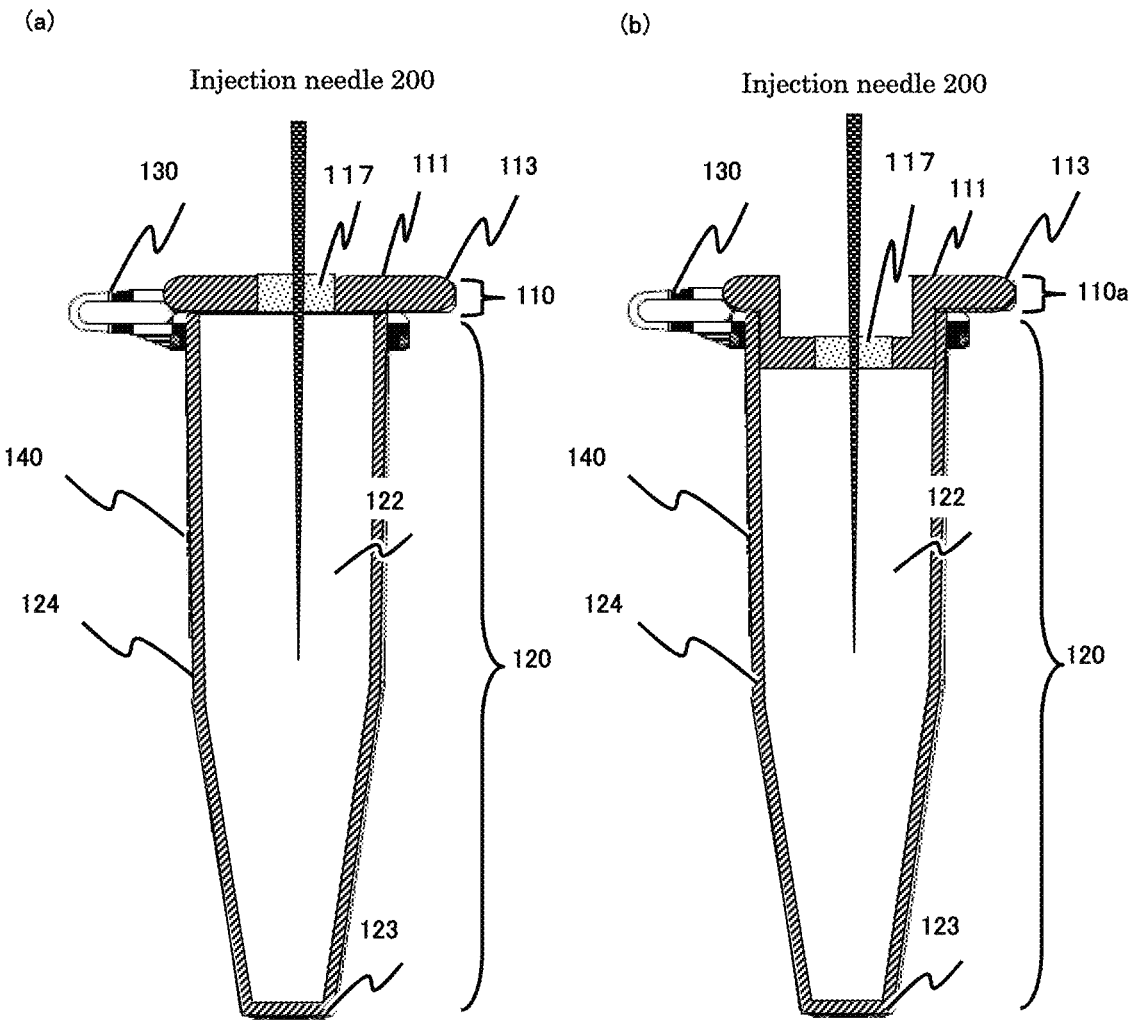
FIG. 14 is a schematic view showing the improvement of accessibility by an injection needle piercing from the upper direction to the inner space of the tube body via the soft portion in the push stopper lid body through which an injection needle can pierce.
Figure 15:
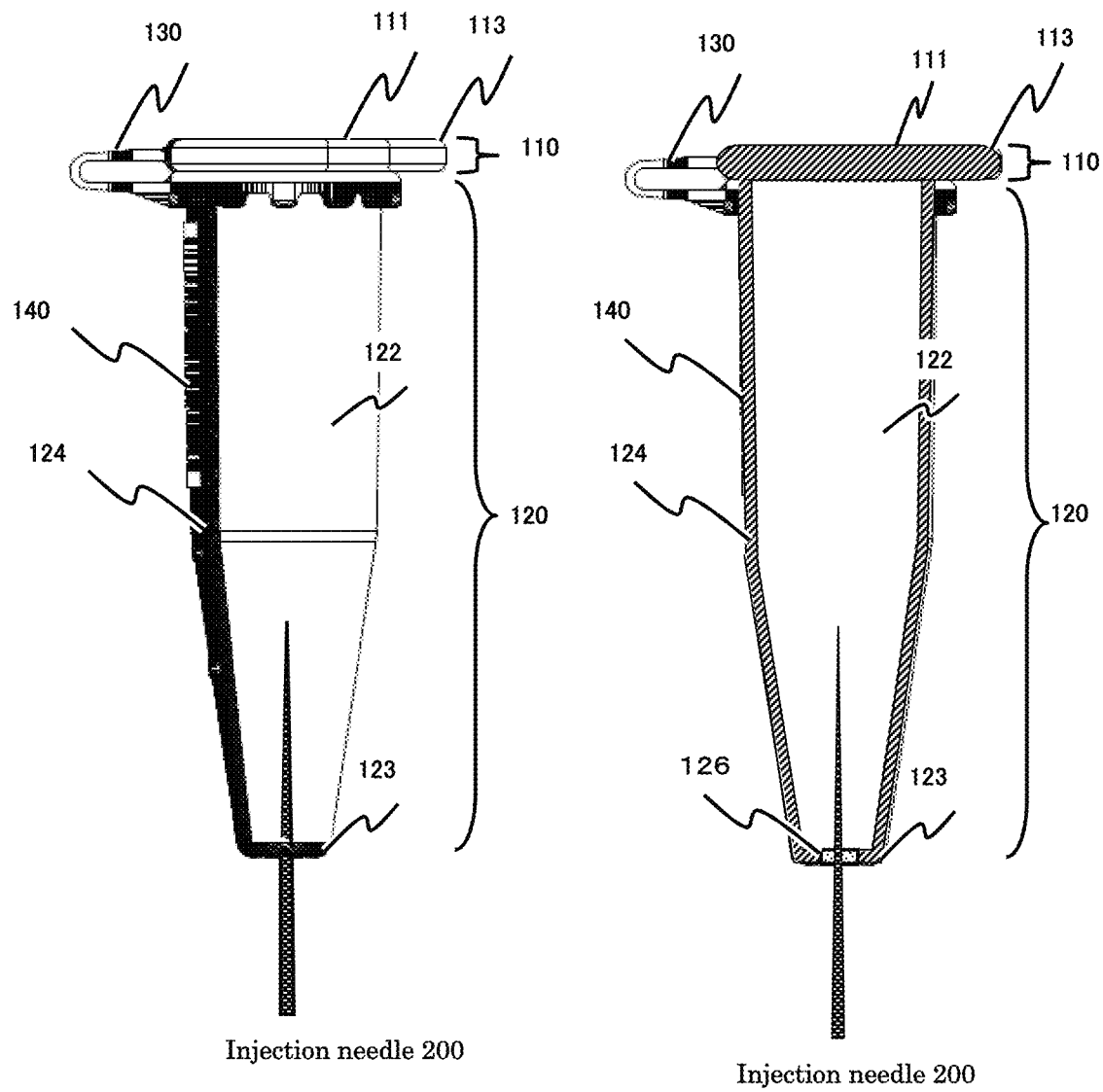
FIG. 15 is a schematic view showing the improvement of accessibility by an injection needle piercing from the lower direction to the inner space of the tube body via the soft portion in the bottom of the tube body through which an injection needle can pierce.
Figure 16:
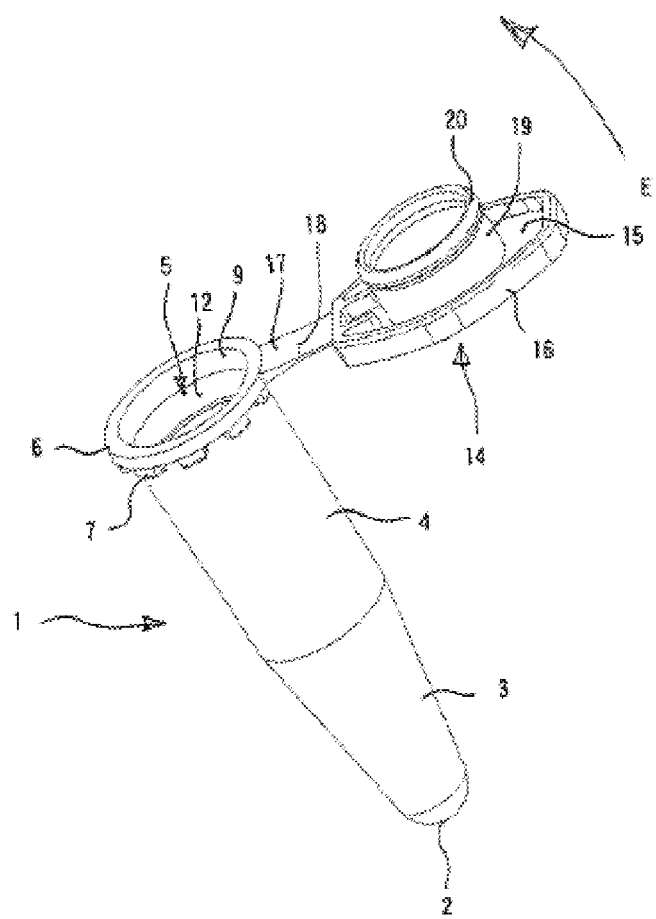
FIG. 16 is a schematic view showing the example of the conventional micro tube with hinge (JP Tokkai 2007-153446).

FIG. 14 is a schematic view showing the improvement of accessibility by an injection needle piercing from the upper direction to the inner space of the tube body via the soft portion in the push stopper lid body through which an injection needle can pierce.

FIG. 14 (a) is the example in which the soft material portion 117 is provided at the center portion of the flat type push stopper lid body 110 shown in Embodiment 1.

As shown in FIG. 14 (a), the soft material portion 117 is soft and an injection needle can pierce it. By piercing with the injection needle 200, the stored sample in the tube body can be accessed from the outside via the injection needle. If the opaque material with elasticity shown in Embodiment 1 to Embodiment 3 has suitable elasticity characteristics for pierce by the injection needle, it can be provided as the soft material through which the sample can be accessed by an injection needle.

FIG. 14 (b) is the example that the soft material portion 117 is provided at the depression portion 116 of the push stopper lid body shown in Embodiment 2.

As shown in FIG. 14 (b), the push stopper lid body 110a includes the depression portion 116 in the center as shown in Embodiment 2. The thickness of the bottom of the depression portion 116 is relatively thin, and it may become the suitable portion for piercing the injection needle.

The sample stored in the tube body 120 can be accessed by piercing the injection needle 200 and drawing the sample without decapping the push stopper lid body 110.

While some preferable embodiments of the sample storage according to the present invention are described above, it should be understood that various changes are possible, without deviating from the technical scope according to the present invention.

INDUSTRIAL APPLICABILITY

A sample storage tube according to the present invention can be employed as a sample storage tube such as a micro tube used extensively for storing a large number of samples.

DESCRIPTION OF THE REFERENCE NUMERALS

100 Sample storage tube
110 Push stopper lid body
111 Upper opening
112 Push stopper body
113 Flange
114 Outer edge portion
115 Information writable area
116 Depression portion
117 Soft material portion
120 Tube body
121 Upper opening
122 Inner cylinder body
123 Bottom surface
124 Information writable area
125 information writable area
130 Hinge body
140 Printed information code

The invention claimed is:

1. A sample storage tube with a hinge comprising;
a tube body for storing a sample;
a push stopper lid for capping the upper opening of the tube body; and
a hinge body for connecting the tube body and the push stopper lid;
wherein the tube body and the push stopper lid are formed by molding as one piece, in which one portion is formed with light transmissive material and the other portion is formed with opaque material as an information writable area,
the opaque material is a laser writable opaque material that can be turned from black to white by irradiating these portions with a laser beam, so that an information code can be printed on the opaque material,
the information writable area with opaque material is formed at least on the upper portion of the push stopper lid and the bottom portion of the tube body; and the information code can be written at least on both the upper portion of the push stopper lid and the bottom portion of the tube body,
the laser writable opaque material is formed continuously from the upper portion of the push stopper lid to the hinge body, and a part of the side portion of the tube body and the bottom portion of the tube body as one piece, and
the hinge body has a dual layer structure comprising an opaque material layer and a light transmissive material layer, wherein the light transmissive material layer on an inner side of the curved portion of the hinge body and the opaque material layer is on an outer side of the curved portion of the hinge body.

2. A sample storage tube with a hinge according to claim 1, wherein the opaque material is a thermoplastic elastomer resin material having elasticity and the light transmissive material is thermoplastic plastic resin material having relatively large rigidity,
either or both of the upper opening portion of the tube body and the push stopper lid for fitting into the upper opening portion of the tube body are formed with the opaque material.

3. A sample storage tube with a hinge according to claim 1, wherein the push stopper lid has a flat shape in its upper surface and a protrusion shape fitting into the upper opening portion of the tube body in its rear side,
wherein the outer edge of the push stopper lid except for the hinge body whose shape is a horseshoe shape is formed by the light transmissive material,
wherein the center of the upper portion of the push stopper lid is formed by the opaque material as the information writable area.

4. A sample storage tube with a hinge according to claim 1, wherein the push stopper lid includes a depression portion in the center of its upper surface and a pillar shape fitting into the upper opening portion of the tube body in its rear side,
wherein the outer edge of the push stopper lid except for the hinge body whose shape is a horseshoe shape is formed by the light transmissive material,
wherein either the flat portion of the upper lid surface around the center depression portion or the bottom surface portion of the center depression portion is formed with the opaque material as an information writable area, and the opaque material portion is an area except for the outer edge and the hinge body whose shape is a horseshoe shape formed by transparent material.

5. A sample storage tube with a hinge according to claim 2, wherein a soft material portion is formed on the lid through which an injection needle can pierce from the upper direction to the inner space of the tube body so that solution sample stored in the tube body can be accessed by the injection needle from outer side via the soft material portion.

6. A sample storage tube with a hinge according to claim 2, wherein a soft material portion is formed on the bottom portion of the tube body through which an injection needle can pierce from the bottom direction to the inner space of the tube body so that solution sample stored in the tube body can be accessed by the injection needle from outer side via the soft material portion.

7. A sample storage tube with a hinge according to claim 1, wherein the side portion area of the continuous one-piece body is a single and linear band figure whose width is narrower than the inner diameter of the tube body.

8. A sample storage tube with a hinge according to claim 1, in which a plurality of printed information code is distributed and printed in the information writable area, wherein
each of the plurality of printed information codes includes one or both of a one-dimensional barcode and a two-dimensional dot code.

9. A sample storage tube with a hinge according to claim 1, wherein an information non-laser-writable area and the information writable area are molded by two-color molding step, and at least the information non-laser-writable area is formed by the light transmissive material and the information writable area is formed by the coloring material containing the color former for printing the printed information codes onto the information writable area.

\* \* \* \* \*